(12) United States Patent
Carothers et al.

(10) Patent No.: US 10,474,227 B2
(45) Date of Patent: Nov. 12, 2019

(54) GENERATION OF VIRTUAL REALITY WITH 6 DEGREES OF FREEDOM FROM LIMITED VIEWER DATA

(71) Applicant: Google LLC, Mountain View, CA (US)

(72) Inventors: Trevor Carothers, Sunnyvale, CA (US); Kurt Akeley, Saratoga, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/897,994

(22) Filed: Feb. 15, 2018

(65) Prior Publication Data
US 2018/0329485 A1    Nov. 15, 2018

Related U.S. Application Data

(63) Continuation-in-part of application No. 15/590,841, filed on May 9, 2017.

(51) Int. Cl.
*G06F 3/01* (2006.01)
*G06T 19/00* (2011.01)
(Continued)

(52) U.S. Cl.
CPC ............. *G06F 3/012* (2013.01); *G06T 7/536* (2017.01); *G06T 19/006* (2013.01);
(Continued)

(58) Field of Classification Search
None
See application file for complete search history.

(56) References Cited

U.S. PATENT DOCUMENTS

| 725,567 A | 4/1903 | Ives |
|---|---|---|
| 4,383,170 A | 5/1983 | Takagi et al. |

(Continued)

FOREIGN PATENT DOCUMENTS

| CN | 101226292 | 7/2008 |
|---|---|---|
| CN | 101309359 | 11/2008 |

(Continued)

OTHER PUBLICATIONS

Wikipedia—Data overlay techniques for real-time visual feed. For example, heads-up displays: http://en.wikipedia.org/wiki/Head-up_display. Retrieved Jan. 2013.
(Continued)

*Primary Examiner* — Said Broome

(57) ABSTRACT

A virtual reality or augmented reality experience may be presented for a viewer through the use of input including only three degrees of freedom. The input may include orientation data indicative of a viewer orientation at which a head of the viewer is oriented. The viewer orientation may be mapped to an estimated viewer location. Viewpoint video may be generated of a scene as viewed from a virtual viewpoint with a virtual location corresponding to the estimated viewer location, from along the viewer orientation. The viewpoint video may be displayed for the viewer. In some embodiments, mapping may be carried out by defining a ray at the viewer orientation, locating an intersection of the ray with a three-dimensional shape, and, based on a location of the intersection, generating the estimated viewer location. The shape may be generated via calibration with a device that receives input including six degrees of freedom.

24 Claims, 20 Drawing Sheets

(51) Int. Cl.
*H04N 13/117* (2018.01)
*G06T 7/536* (2017.01)
*H04N 13/232* (2018.01)
*H04N 13/344* (2018.01)
*H04N 13/366* (2018.01)

(52) U.S. Cl.
CPC ......... *H04N 13/117* (2018.05); *H04N 13/232* (2018.05); *H04N 13/344* (2018.05); *H04N 13/366* (2018.05)

(56) References Cited

U.S. PATENT DOCUMENTS

| | | |
|---|---|---|
| 4,661,986 A | 4/1987 | Adelson |
| 4,694,185 A | 9/1987 | Weiss |
| 4,920,419 A | 4/1990 | Easterly |
| 5,076,687 A | 12/1991 | Adelson |
| 5,077,810 A | 12/1991 | D'Luna |
| 5,157,465 A | 10/1992 | Kronberg |
| 5,251,019 A | 10/1993 | Moorman et al. |
| 5,282,045 A | 1/1994 | Mimura et al. |
| 5,499,069 A | 3/1996 | Griffith |
| 5,572,034 A | 11/1996 | Karellas |
| 5,610,390 A | 3/1997 | Miyano |
| 5,729,471 A | 3/1998 | Jain et al. |
| 5,748,371 A | 5/1998 | Cathey, Jr. et al. |
| 5,757,423 A | 5/1998 | Tanaka et al. |
| 5,818,525 A | 10/1998 | Elabd |
| 5,835,267 A | 11/1998 | Mason et al. |
| 5,907,619 A | 5/1999 | Davis |
| 5,949,433 A | 9/1999 | Klotz |
| 5,974,215 A | 10/1999 | Bilbro et al. |
| 6,005,936 A | 12/1999 | Shimizu et al. |
| 6,021,241 A | 2/2000 | Bilbro et al. |
| 6,023,523 A | 2/2000 | Cohen et al. |
| 6,028,606 A | 2/2000 | Kolb et al. |
| 6,034,690 A | 3/2000 | Gallery et al. |
| 6,061,083 A | 5/2000 | Aritake et al. |
| 6,061,400 A | 5/2000 | Pearlstein et al. |
| 6,069,565 A | 5/2000 | Stern et al. |
| 6,075,889 A | 6/2000 | Hamilton, Jr. et al. |
| 6,084,979 A | 7/2000 | Kanade et al. |
| 6,091,860 A | 7/2000 | Dimitri |
| 6,097,394 A | 8/2000 | Levoy et al. |
| 6,115,556 A | 9/2000 | Reddington |
| 6,137,100 A | 10/2000 | Fossum et al. |
| 6,169,285 B1 | 1/2001 | Pertrillo et al. |
| 6,201,899 B1 | 3/2001 | Bergen |
| 6,221,687 B1 | 4/2001 | Abramovich |
| 6,320,979 B1 | 11/2001 | Melen |
| 6,424,351 B1 | 7/2002 | Bishop et al. |
| 6,448,544 B1 | 9/2002 | Stanton et al. |
| 6,466,207 B1 | 10/2002 | Gortler et al. |
| 6,476,805 B1 | 11/2002 | Shum et al. |
| 6,479,827 B1 | 11/2002 | Hamamoto et al. |
| 6,483,535 B1 | 11/2002 | Tamburrino et al. |
| 6,529,265 B1 | 3/2003 | Henningsen |
| 6,577,342 B1 | 6/2003 | Webster |
| 6,587,147 B1 | 7/2003 | Li |
| 6,597,859 B1 | 7/2003 | Leinhardt et al. |
| 6,606,099 B2 | 8/2003 | Yamada |
| 6,658,168 B1 | 12/2003 | Kim |
| 6,674,430 B1 | 1/2004 | Kaufman et al. |
| 6,680,976 B1 | 1/2004 | Chen et al. |
| 6,687,419 B1 | 2/2004 | Atkin |
| 6,697,062 B1 | 2/2004 | Cabral |
| 6,768,980 B1 | 7/2004 | Meyer et al. |
| 6,785,667 B2 | 8/2004 | Orbanes et al. |
| 6,833,865 B1 | 12/2004 | Fuller et al. |
| 6,842,297 B2 | 1/2005 | Dowski, Jr. et al. |
| 6,900,841 B1 | 5/2005 | Mihara |
| 6,924,841 B2 | 8/2005 | Jones |
| 6,927,922 B2 | 8/2005 | George et al. |
| 7,003,061 B2 | 2/2006 | Wiensky |
| 7,015,954 B1 | 3/2006 | Foote et al. |
| 7,025,515 B2 | 4/2006 | Woods |
| 7,034,866 B1 | 4/2006 | Colmenarez et al. |
| 7,079,698 B2 | 7/2006 | Kobayashi |
| 7,102,666 B2 | 9/2006 | Kanade et al. |
| 7,164,807 B2 | 1/2007 | Morton |
| 7,206,022 B2 | 4/2007 | Miller et al. |
| 7,239,345 B1 | 7/2007 | Rogina |
| 7,286,295 B1 | 10/2007 | Sweatt et al. |
| 7,304,670 B1 | 12/2007 | Hussey et al. |
| 7,329,856 B2 | 2/2008 | Ma et al. |
| 7,336,430 B2 | 2/2008 | George |
| 7,417,670 B1 | 8/2008 | Linzer et al. |
| 7,469,381 B2 | 12/2008 | Ording |
| 7,477,304 B2 | 1/2009 | Hu |
| 7,587,109 B1 | 9/2009 | Reininger |
| 7,620,309 B2 | 11/2009 | Georgiev |
| 7,623,726 B1 | 11/2009 | Georgiev |
| 7,633,513 B2 | 12/2009 | Kondo et al. |
| 7,683,951 B2 | 3/2010 | Aotsuka |
| 7,687,757 B1 | 3/2010 | Tseng et al. |
| 7,723,662 B2 | 5/2010 | Levoy et al. |
| 7,724,952 B2 | 5/2010 | Shum et al. |
| 7,748,022 B1 | 6/2010 | Frazier |
| 7,847,825 B2 | 12/2010 | Aoki et al. |
| 7,936,377 B2 | 5/2011 | Friedhoff et al. |
| 7,936,392 B2 | 5/2011 | Ng et al. |
| 7,941,634 B2 | 5/2011 | Georgi |
| 7,945,653 B2 | 5/2011 | Zuckerberg et al. |
| 7,949,252 B1 | 5/2011 | Georgiev |
| 7,982,776 B2 | 7/2011 | Dunki-Jacobs et al. |
| 8,013,904 B2 | 9/2011 | Tan et al. |
| 8,085,391 B2 | 12/2011 | Machida et al. |
| 8,106,856 B2 | 1/2012 | Matas et al. |
| 8,115,814 B2 | 2/2012 | Iwase et al. |
| 8,155,456 B2 | 4/2012 | Babacan |
| 8,155,478 B2 | 4/2012 | Vitsnudel et al. |
| 8,189,089 B1 | 5/2012 | Georgiev et al. |
| 8,228,417 B1 | 7/2012 | Georgiev et al. |
| 8,248,515 B2 | 8/2012 | Ng et al. |
| 8,259,198 B2 | 9/2012 | Cote et al. |
| 8,264,546 B2 | 9/2012 | Witt |
| 8,279,325 B2 | 10/2012 | Pitts et al. |
| 8,289,440 B2 | 10/2012 | Knight et al. |
| 8,290,358 B1 | 10/2012 | Georgiev |
| 8,310,554 B2 | 11/2012 | Aggarwal et al. |
| 8,315,476 B1 | 11/2012 | Georgiev et al. |
| 8,345,144 B1 | 1/2013 | Georgiev et al. |
| 8,400,533 B1 | 3/2013 | Szedo |
| 8,400,555 B1 | 3/2013 | Georgiev et al. |
| 8,411,948 B2 | 4/2013 | Rother |
| 8,427,548 B2 | 4/2013 | Lim et al. |
| 8,442,397 B2 | 5/2013 | Kang et al. |
| 8,446,516 B2 | 5/2013 | Pitts et al. |
| 8,494,304 B2 | 7/2013 | Venable et al. |
| 8,531,581 B2 | 9/2013 | Shroff |
| 8,542,933 B2 | 9/2013 | Venkataraman et al. |
| 8,559,705 B2 | 10/2013 | Ng |
| 8,570,426 B2 | 10/2013 | Pitts et al. |
| 8,577,216 B2 | 11/2013 | Li et al. |
| 8,581,998 B2 | 11/2013 | Ohno |
| 8,589,374 B2 | 11/2013 | Chaudhri |
| 8,593,564 B2 | 11/2013 | Border et al. |
| 8,605,199 B2 | 12/2013 | Imai |
| 8,614,764 B2 | 12/2013 | Pitts et al. |
| 8,619,082 B1 | 12/2013 | Ciurea et al. |
| 8,629,930 B2 | 1/2014 | Brueckner et al. |
| 8,665,440 B1 | 3/2014 | Kompaniets et al. |
| 8,675,073 B2 | 3/2014 | Aagaard et al. |
| 8,724,014 B2 | 5/2014 | Ng et al. |
| 8,736,710 B2 | 5/2014 | Spielberg |
| 8,736,751 B2 | 5/2014 | Yun |
| 8,749,620 B1 | 6/2014 | Pitts et al. |
| 8,750,509 B2 | 6/2014 | Renkis |
| 8,754,829 B2 | 6/2014 | Lapstun |
| 8,760,566 B2 | 6/2014 | Pitts et al. |
| 8,768,102 B1 | 7/2014 | Ng et al. |
| 8,797,321 B1 | 8/2014 | Bertolami et al. |
| 8,811,769 B1 | 8/2014 | Pitts et al. |
| 8,831,377 B2 | 9/2014 | Pitts et al. |

(56) References Cited

U.S. PATENT DOCUMENTS

| | | |
|---|---|---|
| 8,848,970 B2 | 9/2014 | Aller et al. |
| 8,860,856 B2 | 10/2014 | Wetsztein et al. |
| 8,879,901 B2 | 11/2014 | Caldwell et al. |
| 8,903,232 B1 | 12/2014 | Caldwell |
| 8,908,058 B2 | 12/2014 | Akeley et al. |
| 8,948,545 B2 | 2/2015 | Akeley et al. |
| 8,953,882 B2 | 2/2015 | Lim et al. |
| 8,971,625 B2 | 3/2015 | Pitts et al. |
| 8,976,288 B2 | 3/2015 | Ng et al. |
| 8,988,317 B1 | 3/2015 | Liang et al. |
| 8,995,785 B2 | 3/2015 | Knight et al. |
| 8,997,021 B2 | 3/2015 | Liang et al. |
| 9,001,226 B1 | 4/2015 | Ng et al. |
| 9,013,611 B1 | 4/2015 | Szedo |
| 9,106,914 B2 | 8/2015 | Doser |
| 9,172,853 B2 | 10/2015 | Pitts et al. |
| 9,184,199 B2 | 11/2015 | Pitts et al. |
| 9,201,142 B2 | 12/2015 | Antao |
| 9,201,193 B1 | 12/2015 | Smith |
| 9,210,391 B1 | 12/2015 | Mills |
| 9,214,013 B2 | 12/2015 | Venkataraman et al. |
| 9,262,067 B1 * | 2/2016 | Bell ............... G06F 3/0488 |
| 9,294,662 B2 | 3/2016 | Vondran, Jr. et al. |
| 9,300,932 B2 | 3/2016 | Knight et al. |
| 9,305,375 B2 | 4/2016 | Akeley |
| 9,305,956 B2 | 4/2016 | Pittes et al. |
| 9,386,288 B2 | 7/2016 | Akeley et al. |
| 9,392,153 B2 | 7/2016 | Myhre et al. |
| 9,419,049 B2 | 8/2016 | Pitts et al. |
| 9,467,607 B2 | 10/2016 | Ng et al. |
| 9,497,380 B1 | 11/2016 | Jannard et al. |
| 9,607,424 B2 | 3/2017 | Ng et al. |
| 9,628,684 B2 | 4/2017 | Liang et al. |
| 9,635,332 B2 | 4/2017 | Carroll et al. |
| 9,639,945 B2 | 5/2017 | Oberheu et al. |
| 9,647,150 B2 | 5/2017 | Blasco Claret |
| 9,681,069 B2 | 6/2017 | El-Ghoroury et al. |
| 9,774,800 B2 | 9/2017 | El-Ghoroury et al. |
| 9,858,649 B2 | 1/2018 | Liang et al. |
| 9,866,810 B2 | 1/2018 | Knight et al. |
| 9,900,510 B1 | 2/2018 | Karafin et al. |
| 9,979,909 B2 | 5/2018 | Kuang et al. |
| 10,244,266 B1 | 3/2019 | Wu |
| 2001/0048968 A1 | 12/2001 | Cox et al. |
| 2001/0053202 A1 | 12/2001 | Mazess et al. |
| 2002/0001395 A1 | 1/2002 | Davis et al. |
| 2002/0015048 A1 | 2/2002 | Nister |
| 2002/0061131 A1 | 5/2002 | Sawhney |
| 2002/0109783 A1 | 8/2002 | Hayashi et al. |
| 2002/0159030 A1 | 10/2002 | Frey et al. |
| 2002/0199106 A1 | 12/2002 | Hayashi |
| 2003/0043270 A1 | 3/2003 | Rafey |
| 2003/0081145 A1 | 5/2003 | Seaman et al. |
| 2003/0103670 A1 | 6/2003 | Schoelkopf et al. |
| 2003/0117511 A1 | 6/2003 | Belz et al. |
| 2003/0123700 A1 | 7/2003 | Wakao |
| 2003/0133018 A1 | 7/2003 | Ziemkowski |
| 2003/0147252 A1 | 8/2003 | Fioravanti |
| 2003/0156077 A1 | 8/2003 | Balogh |
| 2003/0172131 A1 | 9/2003 | Ao |
| 2004/0002179 A1 | 1/2004 | Barton et al. |
| 2004/0012688 A1 | 1/2004 | Tinnerinno et al. |
| 2004/0012689 A1 | 1/2004 | Tinnerinno et al. |
| 2004/0101166 A1 | 5/2004 | Williams et al. |
| 2004/0114176 A1 | 6/2004 | Bodin et al. |
| 2004/0135780 A1 | 7/2004 | Nims |
| 2004/0189686 A1 | 9/2004 | Tanguay et al. |
| 2004/0212725 A1 | 10/2004 | Raskar |
| 2004/0257360 A1 | 12/2004 | Sieckmann |
| 2005/0031203 A1 | 2/2005 | Fukuda |
| 2005/0049500 A1 | 3/2005 | Babu et al. |
| 2005/0052543 A1 | 3/2005 | Li et al. |
| 2005/0080602 A1 | 4/2005 | Snyder et al. |
| 2005/0141881 A1 | 6/2005 | Taira et al. |
| 2005/0162540 A1 | 7/2005 | Yata |
| 2005/0212918 A1 | 9/2005 | Serra et al. |
| 2005/0253728 A1 | 11/2005 | Chen et al. |
| 2005/0276441 A1 | 12/2005 | Debevec |
| 2006/0008265 A1 | 1/2006 | Ito |
| 2006/0023066 A1 | 2/2006 | Li et al. |
| 2006/0050170 A1 | 3/2006 | Tanaka |
| 2006/0056040 A1 | 3/2006 | Lan |
| 2006/0056604 A1 | 3/2006 | Sylthe et al. |
| 2006/0072175 A1 | 4/2006 | Oshino |
| 2006/0078052 A1 | 4/2006 | Dang |
| 2006/0082879 A1 | 4/2006 | Miyoshi et al. |
| 2006/0130017 A1 | 6/2006 | Cohen et al. |
| 2006/0208259 A1 | 9/2006 | Jeon |
| 2006/0248348 A1 | 11/2006 | Wakao et al. |
| 2006/0250322 A1 | 11/2006 | Hall et al. |
| 2006/0256226 A1 | 11/2006 | Alon et al. |
| 2006/0274210 A1 | 12/2006 | Kim |
| 2006/0285741 A1 | 12/2006 | Subbarao |
| 2007/0008317 A1 | 1/2007 | Lundstrom |
| 2007/0019883 A1 | 1/2007 | Wong et al. |
| 2007/0030357 A1 | 2/2007 | Levien et al. |
| 2007/0033588 A1 | 2/2007 | Landsman |
| 2007/0052810 A1 | 3/2007 | Monroe |
| 2007/0071316 A1 | 3/2007 | Kubo |
| 2007/0081081 A1 | 4/2007 | Cheng |
| 2007/0097206 A1 | 5/2007 | Houvener |
| 2007/0103558 A1 | 5/2007 | Cai et al. |
| 2007/0113198 A1 | 5/2007 | Robertson et al. |
| 2007/0140676 A1 | 6/2007 | Nakahara |
| 2007/0188613 A1 | 8/2007 | Norbori et al. |
| 2007/0201853 A1 | 8/2007 | Petschnigg |
| 2007/0229653 A1 | 10/2007 | Matusik et al. |
| 2007/0230944 A1 | 10/2007 | Georgiev |
| 2007/0269108 A1 | 11/2007 | Steinberg et al. |
| 2007/0273795 A1 | 11/2007 | Jaynes |
| 2008/0007626 A1 | 1/2008 | Wernersson |
| 2008/0012988 A1 | 1/2008 | Baharav et al. |
| 2008/0018668 A1 | 1/2008 | Yamauchi |
| 2008/0031537 A1 | 2/2008 | Gutkowicz-Krusin et al. |
| 2008/0049113 A1 | 2/2008 | Hirai |
| 2008/0056569 A1 | 3/2008 | Williams et al. |
| 2008/0122940 A1 | 5/2008 | Mori |
| 2008/0129728 A1 | 6/2008 | Satoshi |
| 2008/0144952 A1 | 6/2008 | Chen et al. |
| 2008/0152215 A1 | 6/2008 | Horie et al. |
| 2008/0168404 A1 | 7/2008 | Ording |
| 2008/0180792 A1 | 7/2008 | Georgiev |
| 2008/0187305 A1 | 8/2008 | Raskar et al. |
| 2008/0193026 A1 | 8/2008 | Horie et al. |
| 2008/0205871 A1 | 8/2008 | Utagawa |
| 2008/0226274 A1 | 9/2008 | Spielberg |
| 2008/0232680 A1 | 9/2008 | Berestov et al. |
| 2008/0253652 A1 | 10/2008 | Gupta et al. |
| 2008/0260291 A1 | 10/2008 | Alakarhu et al. |
| 2008/0266688 A1 | 10/2008 | Errando Smet et al. |
| 2008/0277566 A1 | 11/2008 | Utagawa |
| 2008/0309813 A1 | 12/2008 | Watanabe |
| 2008/0316301 A1 | 12/2008 | Givon |
| 2009/0027542 A1 | 1/2009 | Yamamoto et al. |
| 2009/0041381 A1 | 2/2009 | Georgiev et al. |
| 2009/0041448 A1 | 2/2009 | Georgiev et al. |
| 2009/0070710 A1 | 3/2009 | Kagaya |
| 2009/0109280 A1 | 4/2009 | Gotsman |
| 2009/0128658 A1 | 5/2009 | Hayasaka et al. |
| 2009/0128669 A1 | 5/2009 | Ng et al. |
| 2009/0135258 A1 | 5/2009 | Nozaki |
| 2009/0140131 A1 | 6/2009 | Utagawa |
| 2009/0102956 A1 | 7/2009 | Georgiev |
| 2009/0167909 A1 | 7/2009 | Imagawa et al. |
| 2009/0185051 A1 | 7/2009 | Sano |
| 2009/0185801 A1 | 7/2009 | Georgiev et al. |
| 2009/0190022 A1 | 7/2009 | Ichimura |
| 2009/0190024 A1 | 7/2009 | Hayasaka et al. |
| 2009/0195689 A1 | 8/2009 | Hwang et al. |
| 2009/0202235 A1 | 8/2009 | Li et al. |
| 2009/0204813 A1 | 8/2009 | Kwan |
| 2009/0207233 A1 | 8/2009 | Mauchly et al. |
| 2009/0273843 A1 | 11/2009 | Raskar et al. |
| 2009/0290848 A1 | 11/2009 | Brown |

(56) References Cited

U.S. PATENT DOCUMENTS

| | | |
|---|---|---|
| 2009/0295829 A1 | 12/2009 | Georgiev et al. |
| 2009/0309973 A1 | 12/2009 | Kogane |
| 2009/0309975 A1 | 12/2009 | Gordon |
| 2009/0310885 A1 | 12/2009 | Tamaru |
| 2009/0321861 A1 | 12/2009 | Oliver et al. |
| 2010/0003024 A1 | 1/2010 | Agrawal et al. |
| 2010/0011117 A1 | 1/2010 | Hristodorescu et al. |
| 2010/0021001 A1 | 1/2010 | Honsinger et al. |
| 2010/0026852 A1 | 2/2010 | Ng et al. |
| 2010/0050120 A1 | 2/2010 | Ohazama et al. |
| 2010/0060727 A1 | 3/2010 | Steinberg et al. |
| 2010/0097444 A1 | 4/2010 | Lablans |
| 2010/0103311 A1 | 4/2010 | Makii |
| 2010/0107068 A1 | 4/2010 | Butcher et al. |
| 2010/0111489 A1 | 5/2010 | Presler |
| 2010/0123784 A1 | 5/2010 | Ding et al. |
| 2010/0141780 A1 | 6/2010 | Tan et al. |
| 2010/0142839 A1 | 6/2010 | Lakus-Becker |
| 2010/0201789 A1 | 8/2010 | Yahagi |
| 2010/0253782 A1 | 10/2010 | Elazary |
| 2010/0265385 A1 | 10/2010 | Knight et al. |
| 2010/0277617 A1 | 11/2010 | Hollinger |
| 2010/0277629 A1 | 11/2010 | Tanaka |
| 2010/0303288 A1 | 12/2010 | Malone |
| 2010/0328485 A1 | 12/2010 | Imamura et al. |
| 2011/0001858 A1 | 1/2011 | Shintani |
| 2011/0018903 A1 | 1/2011 | Lapstun et al. |
| 2011/0019056 A1 | 1/2011 | Hirsch et al. |
| 2011/0025827 A1 | 2/2011 | Shpunt et al. |
| 2011/0032338 A1 | 2/2011 | Raveendran et al. |
| 2011/0050864 A1 | 3/2011 | Bond |
| 2011/0050909 A1 | 3/2011 | Ellenby |
| 2011/0063414 A1 | 3/2011 | Chen et al. |
| 2011/0069175 A1 | 3/2011 | Mistretta et al. |
| 2011/0075729 A1 | 3/2011 | Dane et al. |
| 2011/0090255 A1 | 4/2011 | Wilson et al. |
| 2011/0091192 A1 | 4/2011 | Iwane |
| 2011/0123183 A1 | 5/2011 | Adelsberger et al. |
| 2011/0129120 A1 | 6/2011 | Chan |
| 2011/0129165 A1 | 6/2011 | Lim et al. |
| 2011/0148764 A1 | 6/2011 | Gao |
| 2011/0149074 A1 | 6/2011 | Lee et al. |
| 2011/0169994 A1 | 7/2011 | DiFrancesco et al. |
| 2011/0194617 A1 | 8/2011 | Kumar et al. |
| 2011/0205384 A1 | 8/2011 | Zamowski et al. |
| 2011/0221947 A1 | 9/2011 | Awazu |
| 2011/0242334 A1 | 10/2011 | Wilburn et al. |
| 2011/0242352 A1 | 10/2011 | Hikosaka |
| 2011/0249341 A1 | 10/2011 | DiFrancesco et al. |
| 2011/0261164 A1 | 10/2011 | Olesen et al. |
| 2011/0261205 A1 | 10/2011 | Sun |
| 2011/0267263 A1 | 11/2011 | Hinckley |
| 2011/0267348 A1 | 11/2011 | Lin |
| 2011/0273466 A1 | 11/2011 | Imai et al. |
| 2011/0279479 A1 | 11/2011 | Rodriguez |
| 2011/0133649 A1 | 12/2011 | Bales et al. |
| 2011/0292258 A1 | 12/2011 | Adler |
| 2011/0293179 A1 | 12/2011 | Dikmen |
| 2011/0298960 A1 | 12/2011 | Tan et al. |
| 2011/0304745 A1 | 12/2011 | Wang et al. |
| 2011/0311046 A1 | 12/2011 | Oka |
| 2011/0316968 A1 | 12/2011 | Taguchi et al. |
| 2012/0014837 A1 | 1/2012 | Fehr et al. |
| 2012/0044330 A1 | 2/2012 | Watanabe |
| 2012/0050562 A1 | 3/2012 | Perwass et al. |
| 2012/0056889 A1 | 3/2012 | Carter et al. |
| 2012/0056982 A1 | 3/2012 | Katz et al. |
| 2012/0057040 A1 | 3/2012 | Park et al. |
| 2012/0057806 A1 | 3/2012 | Backlund et al. |
| 2012/0062755 A1 | 3/2012 | Takahashi et al. |
| 2012/0120240 A1 | 5/2012 | Muramatsu et al. |
| 2012/0132803 A1 | 5/2012 | Hirato et al. |
| 2012/0133746 A1 | 5/2012 | Bigioi et al. |
| 2012/0147205 A1 | 6/2012 | Lelescu et al. |
| 2012/0176481 A1 | 7/2012 | Lukk et al. |
| 2012/0183055 A1 | 7/2012 | Hong et al. |
| 2012/0188344 A1 | 7/2012 | Imai |
| 2012/0201475 A1 | 8/2012 | Carmel et al. |
| 2012/0206574 A1 | 8/2012 | Shikata et al. |
| 2012/0218463 A1 | 8/2012 | Benezra et al. |
| 2012/0224787 A1 | 9/2012 | Imai |
| 2012/0229691 A1 | 9/2012 | Hiasa et al. |
| 2012/0249529 A1 | 10/2012 | Matsumoto et al. |
| 2012/0249550 A1 | 10/2012 | Akeley |
| 2012/0249819 A1 | 10/2012 | Imai |
| 2012/0251131 A1 | 10/2012 | Henderson et al. |
| 2012/0257065 A1 | 10/2012 | Velarde et al. |
| 2012/0257795 A1 | 10/2012 | Kim et al. |
| 2012/0268367 A1 | 10/2012 | Vertegaal et al. |
| 2012/0269274 A1 | 10/2012 | Kim et al. |
| 2012/0271115 A1 | 10/2012 | Buerk |
| 2012/0272271 A1 | 10/2012 | Nishizawa et al. |
| 2012/0287246 A1 | 11/2012 | Katayama |
| 2012/0287296 A1 | 11/2012 | Fukui |
| 2012/0287329 A1 | 11/2012 | Yahata |
| 2012/0293075 A1 | 11/2012 | Engelen et al. |
| 2012/0300091 A1 | 11/2012 | Shroff et al. |
| 2012/0237222 A9 | 12/2012 | Ng et al. |
| 2012/0321172 A1 | 12/2012 | Jachalsky et al. |
| 2013/0002902 A1 | 1/2013 | Ito |
| 2013/0002936 A1 | 1/2013 | Hirama et al. |
| 2013/0021486 A1 | 1/2013 | Richardson |
| 2013/0038696 A1 | 2/2013 | Ding et al. |
| 2013/0041215 A1 | 2/2013 | McDowall |
| 2013/0044290 A1 | 2/2013 | Kawamura |
| 2013/0050546 A1 | 2/2013 | Kano |
| 2013/0064453 A1 | 3/2013 | Nagasaka et al. |
| 2013/0064532 A1 | 3/2013 | Caldwell et al. |
| 2013/0070059 A1 | 3/2013 | Kushida |
| 2013/0070060 A1 | 3/2013 | Chatterjee et al. |
| 2013/0077880 A1 | 3/2013 | Venkataraman et al. |
| 2013/0082905 A1 | 4/2013 | Ranieri et al. |
| 2013/0088616 A1 | 4/2013 | Ingrassia, Jr. |
| 2013/0093844 A1 | 4/2013 | Shuto |
| 2013/0093859 A1 | 4/2013 | Nakamura |
| 2013/0094101 A1 | 4/2013 | Oguchi |
| 2013/0107085 A1 | 5/2013 | Ng et al. |
| 2013/0113981 A1 | 5/2013 | Knight et al. |
| 2013/0120356 A1 | 5/2013 | Georgiev et al. |
| 2013/0120605 A1 | 5/2013 | Georgiev et al. |
| 2013/0120636 A1 | 5/2013 | Baer |
| 2013/0121577 A1 | 5/2013 | Wang |
| 2013/0127901 A1 | 5/2013 | Georgiev et al. |
| 2013/0128052 A1 | 5/2013 | Catrein et al. |
| 2013/0128081 A1 | 5/2013 | Georgiev et al. |
| 2013/0128087 A1 | 5/2013 | Georgiev et al. |
| 2013/0129213 A1 | 5/2013 | Shectman |
| 2013/0135448 A1 | 5/2013 | Nagumo et al. |
| 2013/0176481 A1 | 7/2013 | Holmes et al. |
| 2013/0188068 A1 | 7/2013 | Said |
| 2013/0215108 A1 | 8/2013 | McMahon et al. |
| 2013/0215226 A1 | 8/2013 | Chauvier et al. |
| 2013/0222656 A1 | 8/2013 | Kaneko |
| 2013/0234935 A1 | 9/2013 | Griffith |
| 2013/0242137 A1 | 9/2013 | Kirkland |
| 2013/0243391 A1 | 9/2013 | Park et al. |
| 2013/0258451 A1 | 10/2013 | El-Ghoroury et al. |
| 2013/0262511 A1 | 10/2013 | Kuffner et al. |
| 2013/0286236 A1 | 10/2013 | Mankowski |
| 2013/0321574 A1 | 12/2013 | Zhang et al. |
| 2013/0321581 A1 | 12/2013 | El-Ghoroury |
| 2013/0321677 A1 | 12/2013 | Cote et al. |
| 2013/0329107 A1 | 12/2013 | Burley et al. |
| 2013/0329132 A1 | 12/2013 | Tico et al. |
| 2013/0335596 A1 | 12/2013 | Demandoix et al. |
| 2013/0342700 A1 | 12/2013 | Kass |
| 2014/0002502 A1 | 1/2014 | Han |
| 2014/0002699 A1 | 1/2014 | Guan |
| 2014/0003719 A1 | 1/2014 | Bai et al. |
| 2014/0013273 A1 | 1/2014 | Ng |
| 2014/0035959 A1 | 2/2014 | Lapstun |
| 2014/0037280 A1 | 2/2014 | Shirakawa |
| 2014/0049663 A1 | 2/2014 | Ng et al. |
| 2014/0059462 A1 | 2/2014 | Wernersson |

(56) References Cited

U.S. PATENT DOCUMENTS

| | | |
|---|---|---|
| 2014/0085282 A1 | 3/2014 | Luebke et al. |
| 2014/0092424 A1 | 4/2014 | Grosz |
| 2014/0098191 A1 | 4/2014 | Rime et al. |
| 2014/0132741 A1 | 5/2014 | Aagaard et al. |
| 2014/0133749 A1 | 5/2014 | Kuo et al. |
| 2014/0139538 A1 | 5/2014 | Barber et al. |
| 2014/0167196 A1 | 6/2014 | Heimgartner et al. |
| 2014/0168484 A1 | 6/2014 | Suzuki |
| 2014/0176540 A1 | 6/2014 | Tosic et al. |
| 2014/0176592 A1 | 6/2014 | Wilburn et al. |
| 2014/0176710 A1 | 6/2014 | Brady |
| 2014/0177905 A1 | 6/2014 | Grefalda |
| 2014/0184885 A1 | 7/2014 | Tanaka et al. |
| 2014/0192208 A1 | 7/2014 | Okincha |
| 2014/0193047 A1 | 7/2014 | Grosz |
| 2014/0195921 A1 | 7/2014 | Grosz |
| 2014/0204111 A1 | 7/2014 | Vaidyanathan et al. |
| 2014/0211077 A1 | 7/2014 | Ng et al. |
| 2014/0218540 A1 | 8/2014 | Geiss et al. |
| 2014/0226038 A1 | 8/2014 | Kimura |
| 2014/0240463 A1 | 8/2014 | Pitts et al. |
| 2014/0240578 A1 | 8/2014 | Fishman et al. |
| 2014/0245367 A1 | 8/2014 | Sasaki |
| 2014/0267243 A1 | 9/2014 | Venkataraman et al. |
| 2014/0267639 A1 | 9/2014 | Tatsuta |
| 2014/0300753 A1 | 10/2014 | Yin |
| 2014/0313350 A1 | 10/2014 | Keelan |
| 2014/0313375 A1 | 10/2014 | Milnar |
| 2014/0333787 A1 | 11/2014 | Venkataraman |
| 2014/0340390 A1 | 11/2014 | Lanman et al. |
| 2014/0347540 A1 | 11/2014 | Kang |
| 2014/0354863 A1 | 12/2014 | Ahn et al. |
| 2014/0368494 A1 | 12/2014 | Sakharnykh et al. |
| 2014/0368640 A1 | 12/2014 | Strandemar et al. |
| 2015/0042767 A1 | 2/2015 | Ciurea et al. |
| 2015/0049915 A1 | 2/2015 | Ciurea et al. |
| 2015/0062178 A1 | 3/2015 | Matas et al. |
| 2015/0062386 A1 | 3/2015 | Sugawara |
| 2015/0092071 A1 | 4/2015 | Meng et al. |
| 2015/0097985 A1 | 4/2015 | Akeley |
| 2015/0130986 A1 | 5/2015 | Ohnishi |
| 2015/0161798 A1 | 6/2015 | Venkataraman et al. |
| 2015/0193937 A1 | 7/2015 | Georgiev et al. |
| 2015/0206340 A1 | 7/2015 | Munkberg et al. |
| 2015/0207990 A1 | 7/2015 | Ford et al. |
| 2015/0223731 A1* | 8/2015 | Sahin .............. A61B 5/16 600/301 |
| 2015/0237273 A1 | 8/2015 | Sawadaishi |
| 2015/0264337 A1 | 9/2015 | Venkataraman et al. |
| 2015/0104101 A1 | 10/2015 | Bryant et al. |
| 2015/0288867 A1 | 10/2015 | Kajimura |
| 2015/0304544 A1 | 10/2015 | Eguchi |
| 2015/0304667 A1 | 10/2015 | Suehring et al. |
| 2015/0310592 A1 | 10/2015 | Kano |
| 2015/0312553 A1 | 10/2015 | Ng et al. |
| 2015/0312593 A1 | 10/2015 | Akeley et al. |
| 2015/0334420 A1 | 11/2015 | De Vieeschauwer et al. |
| 2015/0346832 A1 | 12/2015 | Cole et al. |
| 2015/0370011 A1 | 12/2015 | Ishihara |
| 2015/0370012 A1 | 12/2015 | Ishihara |
| 2015/0373279 A1 | 12/2015 | Osborne |
| 2016/0029002 A1 | 1/2016 | Balko |
| 2016/0029017 A1 | 1/2016 | Liang |
| 2016/0037178 A1 | 2/2016 | Lee et al. |
| 2016/0065931 A1 | 3/2016 | Konieczny |
| 2016/0065947 A1 | 3/2016 | Cole et al. |
| 2016/0142615 A1 | 5/2016 | Liang |
| 2016/0155215 A1 | 6/2016 | Suzuki |
| 2016/0165206 A1 | 6/2016 | Huang et al. |
| 2016/0173844 A1 | 6/2016 | Knight et al. |
| 2016/0182893 A1 | 6/2016 | Wan |
| 2016/0191823 A1 | 6/2016 | El-Ghoroury |
| 2016/0227244 A1 | 8/2016 | Rosewarne |
| 2016/0247324 A1 | 8/2016 | Mullins et al. |
| 2016/0253837 A1 | 9/2016 | Zhu et al. |
| 2016/0269620 A1 | 9/2016 | Romanenko et al. |
| 2016/0307368 A1 | 10/2016 | Akeley |
| 2016/0307372 A1 | 10/2016 | Pitts et al. |
| 2016/0309065 A1 | 10/2016 | Karafin et al. |
| 2016/0337635 A1 | 11/2016 | Nisenzon |
| 2016/0353006 A1 | 12/2016 | Anderson |
| 2016/0353026 A1 | 12/2016 | Blonde et al. |
| 2016/0381348 A1 | 12/2016 | Hayasaka |
| 2017/0031146 A1 | 2/2017 | Zheng |
| 2017/0059305 A1 | 3/2017 | Nonn et al. |
| 2017/0067832 A1 | 3/2017 | Ferrara, Jr. et al. |
| 2017/0078578 A1 | 3/2017 | Sato |
| 2017/0094906 A1 | 3/2017 | Liang et al. |
| 2017/0134639 A1 | 5/2017 | Pitts et al. |
| 2017/0139131 A1 | 5/2017 | Karafin et al. |
| 2017/0221226 A1 | 8/2017 | Shen |
| 2017/0237971 A1 | 8/2017 | Pitts et al. |
| 2017/0243373 A1 | 8/2017 | Bevensee et al. |
| 2017/0244948 A1 | 8/2017 | Pang et al. |
| 2017/0256036 A1 | 9/2017 | Song et al. |
| 2017/0263012 A1 | 9/2017 | Sabater et al. |
| 2017/0302903 A1 | 10/2017 | Ng et al. |
| 2017/0316602 A1 | 11/2017 | Smirnov et al. |
| 2017/0358092 A1 | 12/2017 | Bleibel et al. |
| 2017/0365068 A1 | 12/2017 | Tan et al. |
| 2017/0374411 A1 | 12/2017 | Lederer et al. |
| 2018/0007253 A1 | 1/2018 | Abe |
| 2018/0012397 A1 | 1/2018 | Carothers |
| 2018/0020204 A1 | 1/2018 | Pang et al. |
| 2018/0024753 A1 | 1/2018 | Gewickey et al. |
| 2018/0033209 A1 | 2/2018 | Akeley et al. |
| 2018/0034134 A1 | 2/2018 | Pang et al. |
| 2018/0139436 A1 | 2/2018 | Yucer et al. |
| 2018/0070066 A1 | 3/2018 | Knight et al. |
| 2018/0070067 A1 | 3/2018 | Knight et al. |
| 2018/0082405 A1 | 3/2018 | Liang |
| 2018/0089903 A1 | 3/2018 | Pang et al. |
| 2018/0097867 A1 | 4/2018 | Pang et al. |
| 2018/0124371 A1 | 5/2018 | Kamal et al. |
| 2018/0158198 A1 | 6/2018 | Kamad |
| 2018/0199039 A1 | 7/2018 | Trepte |

FOREIGN PATENT DOCUMENTS

| | | |
|---|---|---|
| DE | 19624421 | 1/1997 |
| JP | 2010020100 | 1/2010 |
| JP | 2011135170 | 7/2011 |
| WO | 2003052465 | 6/2003 |
| WO | 2006039486 | 4/2006 |
| WO | 2007092545 | 8/2007 |
| WO | 2007092581 | 8/2007 |
| WO | 2011010234 | 3/2011 |
| WO | 2011029209 | 3/2011 |
| WO | 2011081187 | 7/2011 |

OTHER PUBLICATIONS

Wikipedia—Exchangeable image file format: http://en.wikipedia.org/wiki/Exchangeable_image_file_format. Retrieved Jan. 2013.

Wikipedia—Expeed: http://en.wikipedia.org/wiki/EXPEED. Retrieved Jan. 15, 2014.

Wikipedia—Extensible Metadata Platform: http://en.wikipedia.org/wiki/Extensible_Metadata_Platform. Retrieved Jan. 2013.

Wikipedia—Key framing for video animation: http://en.wikipedia.org/wiki/Key_frame. Retrieved Jan. 2013.

Wikipedia—Lazy loading of image data: http://en.wikipedia.org/wiki/Lazy_loading. Retrieved Jan. 2013.

Wikipedia—Methods of Variable Bitrate Encoding: http://en.wikipedia.org/wiki/Variable_bitrate#Methods_of_VBR_encoding. Retrieved Jan. 2013.

Wikipedia—Portable Network Graphics format: http://en.wikipedia.org/wiki/Portable_Network_Graphics. Retrieved Jan. 2013.

Wikipedia—Unsharp Mask Technique: https://en.wikipedia.org/wiki/Unsharp_masking. Retrieved May 3, 2016.

Wilburn et al., "High Performance Imaging using Large Camera Arrays", ACM Transactions on Graphics (TOG), vol. 24, Issue 3 (Jul. 2005), Proceedings of ACM SIGGRAPH 2005, pp. 765-776.

(56) References Cited

OTHER PUBLICATIONS

Wilburn, Bennett, et al., "High Speed Video Using a Dense Camera Array", 2004.
Wilburn, Bennett, et al., "The Light Field Video Camera", Proceedings of Media Processors 2002.
Williams, L. "Pyramidal Parametrics," Computer Graphic (1983).
Winnemoller, H., et al., "Light Waving: Estimating Light Positions From Photographs Alone", Eurographics 2005.
Wippermann, F. "Chirped Refractive Microlens Array," Dissertation 2007.
Wuu, S., et al., "A Manufacturable Back-Side Illumination Technology Using Bulk Si Substrate for Advanced CMOS Image Sensors", 2009 International Image Sensor Workshop, Bergen, Norway.
Wuu, S., et al., "BSI Technology with Bulk Si Wafer", 2009 International Image Sensor Workshop, Bergen, Norway.
Xiao, Z. et al., "Aliasing Detection and Reduction in Plenoptic Imaging," IEEE Conference on Computer Vision and Pattern Recognition; 2014.
Xu, Xin et al., "Robust Automatic Focus Algorithm for Low Contrast Images Using a New Contrast Measure," Sensors 2011; 14 pages.
Zheng, C. et al., "Parallax Photography: Creating 3D Cinematic Effects from Stills", Proceedings of Graphic Interface, 2009.
Zitnick, L. et al., "High-Quality Video View Interpolation Using a Layered Representation," Aug. 2004; ACM Transactions on Graphics (TOG), Proceedings of ACM SIGGRAPH 2004; vol. 23, Issue 3; pp. 600-608.
Zoberbier, M., et al., "Wafer Cameras—Novel Fabrication and Packaging Technologies", 2009 International Image Senor Workshop, Bergen, Norway, 5 pages.
U.S. Appl. No. 15/967,076, filed Apr. 30, 2018 listing Jiantao Kuang et al. as inventors, entitled "Automatic Lens Flare Detection and Correction for Light-Field Images".
U.S. Appl. No. 15/666,298, filed Aug. 1, 2017 listing Yonggang Ha et al. as inventors, entitled "Focal Reducer With Controlled Optical Properties for Interchangeable Lens Light-Field Camera".
U.S. Appl. No. 15/590,808, filed May 9, 2017 listing Alex Song et al. as inventors, entitled "Adaptive Control for Immersive Experience Delivery".
U.S. Appl. No. 15/864,938, filed Jan. 8, 2018 listing Jon Karafin et al. as inventors, entitled "Motion Blur for Light-Field Images".
U.S. Appl. No. 15/703,553, filed Sep. 13, 2017 listing Jon Karafin et al. as inventors, entitled "4D Camera Tracking and Optical Stabilization".
U.S. Appl. No. 15/590,841, filed May 9, 2017 listing Kurt Akeley et al. as inventors, entitled "Vantage Generation and Interactive Playback".
U.S. Appl. No. 15/590,951, filed May 9, 2017 listing Alex Song et al. as inventors, entitled "Wedge-Based Light-Field Video Capture".
U.S. Appl. No. 15/944,551, filed Apr. 3, 2018 listing Zejing Wang et al. as inventors, entitled "Generating Dolly Zoom Effect Using Light Field Image Data".
U.S. Appl. No. 15/874,723, filed Jan. 18, 2018 listing Mark Weir et al. as inventors, entitled "Multi-Camera Navigation Interface".
U.S. Appl. No. 15/605,037, filed May 25, 2017 listing Zejing Wang et al. as inventors, entitled "Multi-View Back-Projection to a Light-Field".
U.S. Appl. No. 15/897,836, filed Feb. 15, 2018 listing Francois Bleibel et al. as inventors, entitled "Multi-View Contour Tracking".
U.S. Appl. No. 15/897,942, filed Feb. 15, 2018 listing Francois Bleibel et al. as inventors, entitled "Multi-View Contour Tracking With Grabcut".
Adelsberger, R. et al., "Spatially Adaptive Photographic Flash," ETH Zurich, Department of Computer Science, Technical Report 612, 2008, pp. 1-12.
Adelson et al., "Single Lens Stereo with a Plenoptic Camera" IEEE Translation on Pattern Analysis and Machine Intelligence, Feb. 1992. vol. 14, No. 2, pp. 99-106.
Adelson, E. H., and Bergen, J. R. 1991. The plenoptic function and the elements of early vision. In Computational Models of Visual Processing, edited by Michael S. Landy and J. Anthony Movshon. Cambridge, Mass.: mit Press.
Adobe Systems Inc, "XMP Specification", Sep. 2005.
Adobe, "Photoshop CS6 / in depth: Digital Negative (DNG)", http://www.adobe.com/products/photoshop/extend. displayTab2html. Retrieved Jan. 2013.
Agarwala, A., et al., "Interactive Digital Photomontage," ACM Transactions on Graphics, Proceedings of SIGGRAPH 2004, vol. 32, No. 3, 2004.
Andreas Observatory, Spectrograph Manual: IV. Flat-Field Correction, Jul. 2006.
Apple, "Apple iPad: Photo Features on the iPad", Retrieved Jan. 2013.
Bae, S., et al., "Defocus Magnification", Computer Graphics Forum, vol. 26, Issue 3 (Proc. of Eurographics 2007), pp. 1-9.
Belhumeur, Peter et al., "The Bas-Relief Ambiguity", International Journal of Computer Vision, 1997, pp. 1060-1066.
Belhumeur, Peter, et al., "The Bas-Relief Ambiguity", International Journal of Computer Vision, 1999, pp. 33-44, revised version.
Bhat, P. et al. "GradientShop: A Gradient-Domain Optimization Framework for Image and Video Filtering," SIGGRAPH 2010; 14 pages.
Bolles, R., et al., "Epipolar-Plane Image Analysis: An Approach to Determining Structure from Motion", International Journal of Computer Vision, 1, 7-55 (1987).
Bourke, Paul, "Image filtering in the Frequency Domain," pp. 1-9, Jun. 1998.
Canon, Canon Speedlite wireless flash system, User manual for Model 550EX, Sep. 1998.
Chai, Jin-Xang et al., "Plenoptic Sampling", ACM SIGGRAPH 2000, Annual Conference Series, 2000, pp. 307-318.
Chen, S. et al., "A CMOS Image Sensor with On-Chip Image Compression Based on Predictive Boundary Adaptation and Memoryless QTD Algorithm," Very Large Scalee Integration (VLSI) Systems, IEEE Transactions, vol. 19, Issue 4; Apr. 2011.
Chen, W., et al., "Light Field mapping: Efficient representation and hardware rendering of surface light fields", ACM Transactions on Graphics 21, 3, 447-456, 2002.
Cohen, Noy et al., "Enhancing the performance of the light field microscope using wavefront coding," Optics Express, vol. 22, issue 20; 2014.
Daly, D., "Microlens Arrays" Retrieved Jan. 2013.
Debevec, et al, "A Lighting Reproduction Approach to Live-Action Compoisting" Proceedings SIGGRAPH 2002.
Debevec, P., et al., "Acquiring the reflectance field of a human face", SIGGRAPH 2000.
Debevec, P., et al., "Recovering high dynamic radiance maps from photographs", SIGGRAPH 1997, 369-378.
Design of the xBox menu. Retrieved Jan. 2013.
Digital Photography Review, "Sony Announce new RGBE CCD," Jul. 2003.
Dorsey, J., et al., "Design and simulation of opera light and projection effects", in Computer Graphics (Proceedings of SIGGRAPH 91), vol. 25, 41-50.
Dorsey, J., et al., "Interactive design of complex time dependent lighting", IEEE Computer Graphics and Applications 15, 2 (Mar. 1995), 26-36.
Dowski et al., "Wavefront coding: a modern method of achieving high performance and/or low cost imaging systems" SPIE Proceedings, vol. 3779, Jul. 1999, pp. 137-145.
Dowski, Jr. "Extended Depth of Field Through Wave-Front Coding," Applied Optics, vol. 34, No. 11, Apr. 10, 1995; pp. 1859-1866.
Duparre, J. et al., "Micro-Optical Artificial Compound Eyes," Institute of Physics Publishing, Apr. 2006.
Eisemann, Elmar, et al., "Flash Photography Enhancement via Intrinsic Relighting", SIGGRAPH 2004.
Fattal, Raanan, et al., "Multiscale Shape and Detail Enhancement from Multi-light Image Collections", SIGGRAPH 2007.
Fernando, Randima, "Depth of Field—A Survey of Techniques," GPU Gems. Boston, MA; Addison-Wesley, 2004.
Fitzpatrick, Brad, "Camlistore", Feb. 1, 2011.

(56) References Cited

OTHER PUBLICATIONS

Fujifilm, Super CCD EXR Sensor by Fujifilm, brochure reference No. EB-807E, 2008.
Georgiev, T. et al., "Reducing Plenoptic Camera Artifacts," Computer Graphics Forum, vol. 29, No. 6, pp. 1955-1968; 2010.
Georgiev, T., et al., "Spatio-Angular Resolution Tradeoff in Integral Photography," Proceedings of Eurographics Symposium on Rendering, 2006.
Georgiev, T., et al., "Suppersolution with Plenoptic 2.0 Cameras," Optical Society of America 2009; pp. 1-3.
Georgiev, T., et al., "Unified Frequency Domain Analysis of Lightfield Cameras" (2008).
Georgiev, T., et al., Plenoptic Camera 2.0 (2008).
Girod, B., "Mobile Visual Search", IEEE Signal Processing Magazine, Jul. 2011.
Gortler et al., "The lumigraph" SIGGRAPH 96, pp. 43-54.
Groen et al., "A Comparison of Different Focus Functions for Use in Autofocus Algorithms," Cytometry 6:81-91, 1985.
Haeberli, Paul "A Multifocus Method for Controlling Depth of Field" GRAPHICA Obscura, 1994, pp. 1-3.
Heide, F. et al., "High-Quality Computational Imaging Through Simple Lenses," ACM Transactions on Graphics, SIGGRAPH 2013; pp. 1-7.
Heidelberg Collaboratory for Image Processing, "Consistent Depth Estimation in a 4D Light Field," May 2013.
Hirigoyen, F., et al., "1.1 um Backside Imager vs. Frontside Image: an optics-dedicated FDTD approach", IEEE 2009 International Image Sensor Workshop.
Huang, Fu-Chung et al., "Eyeglasses-free Display: Towards Correcting Visual Aberrations with Computational Light Field Displays," ACM Transaction on Graphics, Aug. 2014, pp. 1-12.
Isaksen, A., et al., "Dynamically Reparameterized Light Fields," SIGGRAPH 2000, pp. 297-306.
Ives H., "Optical properties of a Lippman lenticulated sheet," J. Opt. Soc. Am. 21, 171 (1931).
Ives, H. "Parallax Panoramagrams Made with a Large Diameter Lens", Journal of the Optical Society of America; 1930.
Jackson et al., "Selection of a Convolution Function for Fourier Inversion Using Gridding" IEEE Transactions on Medical Imaging, Sep. 1991, vol. 10, No. 3, pp. 473-478.
Kautz, J., et al., "Fast arbitrary BRDF shading for low-frequency lighting using spherical harmonics", in Eurographic Rendering Workshop 2002, 291-296.
Koltun, et al., "Virtual Occluders: An Efficient Interediate PVS Representation", Rendering Techniques 2000: Proc. 11th Eurographics Workshop Rendering, pp. 59-70, Jun. 2000.
Kopf, J., et al., Deep Photo: Model-Based Photograph Enhancement and Viewing, SIGGRAPH Asia 2008.
Lehtinen, J., et al. "Matrix radiance transfer", in Symposium on Interactive 3D Graphics, 59-64, 2003.
Lesser, Michael, "Back-Side Illumination", 2009.
Levin, A., et al., "Image and Depth from a Conventional Camera with a Coded Aperture", SIGGRAPH 2007, pp. 1-9.
Levoy et al.,"Light Field Rendering" SIGGRAPH 96 Proceeding, 1996. pp. 31-42.
Levoy, "Light Fields and Computational Imaging" IEEE Computer Society, Aug. 2006, pp. 46-55.
Levoy, M. "Light Field Photography and Videography," Oct. 18, 2005.
Levoy, M. "Stanford Light Field Microscope Project," 2008; http://graphics.stanford.edu/projects/lfmicroscope/, 4 pages.
Levoy, M., "Autofocus: Contrast Detection", http://graphics.stanford.edu/courses/cs178/applets/autofocusPD.html, pp. 1-3, 2010.
Levoy, M., "Autofocus: Phase Detection", http://graphics.stanford.edu/courses/cs178/applets/autofocusPD.html, pp. 1-3, 2010.
Levoy, M., et al., "Light Field Microscopy," ACM Transactions on Graphics, vol. 25, No. 3, Proceedings SIGGRAPH 2006.
Liang, Chia-Kai, et al., "Programmable Aperture Photography: Multiplexed Light Field Acquisition", ACM SIGGRAPH, 2008.

Lippmann, "Reversible Prints", Communication at the French Society of Physics, Journal of Physics, 7 , 4, Mar. 1908, pp. 821-825.
Lumsdaine et al., "Full Resolution Lightfield Rendering" Adobe Technical Report Jan. 2008, pp. 1-12.
Maeda, Y. et al., "A CMOS Image Sensor with Pseudorandom Pixel Placement for Clear Imaging," 2009 International Symposium on Intelligent Signal Processing and Communication Systems, Dec. 2009.
Magnor, M. et al., "Model-Aided Coding of Multi-Viewpoint Image Data," Proceedings IEEE Conference on Image Processing, ICIP-2000, Vancouver, Canada, Sep. 2000. https://graphics.tu-bs.de/static/people/magnor/publications/icip00.pdf.
Mallat, Stephane, "A Wavelet Tour of Signal Processing", Academic Press 1998.
Malzbender, et al., "Polynomial Texture Maps", Proceedings SIGGRAPH 2001.
Marshall, Richard J. et al., "Improving Depth Estimation from a Plenoptic Camera by Patterned Illumination," Proc. of SPIE, vol. 9528, 2015, pp. 1-6.
Masselus, Vincent, et al., "Relighting with 4D Incident Light Fields", SIGGRAPH 2003.
Meynants, G., et al., "Pixel Binning in CMOS Image Sensors," Frontiers in Electronic Imaging Conference, 2009.
Moreno-Noguer, F. et al., "Active Refocusing of Images and Videos," ACM Transactions on Graphics, Aug. 2007; pp. 1-9.
Munkberg, J. et al., "Layered Reconstruction for Defocus and Motion Blur" EGSR 2014, pp. 1-12.
Naemura et al., "3-D Computer Graphics based on Integral Photography" Optics Express, Feb. 12, 2001. vol. 8, No. 2, pp. 255-262.
Nakamura, J., "Image Sensors and Signal Processing for Digital Still Cameras" (Optical Science and Engineering), 2005.
National Instruments, "Anatomy of a Camera," pp. 1-5, Sep. 6, 2006.
Nayar, Shree, et al., "Shape from Focus", IEEE Transactions on Pattern Analysis and Machine Intelligence, vol. 16, No. 8, pp. 824-831, Aug. 1994.
Ng, R., et al. "Light Field Photography with a Hand-held Plenoptic Camera," Stanford Technical Report, CSTR 2005-2, 2005.
Ng, R., et al., "All-Frequency Shadows Using Non-linear Wavelet Lighting Approximation. ACM Transactions on Graphics," ACM Transactions on Graphics; Proceedings of SIGGRAPH 2003.
Ng, R., et al., "Triple Product Wavelet Integrals for All-Frequency Relighting", ACM Transactions on Graphics (Proceedings of SIGGRAPH 2004).
Ng, Yi-Ren, "Digital Light Field Photography," Doctoral Thesis, Standford University, Jun. 2006; 203 pages.
Ng., R., "Fourier Slice Photography," ACM Transactions on Graphics, Proceedings of SIGGRAPH 2005, vol. 24, No. 3, 2005, pp. 735-744.
Nguyen, Hubert. "Practical Post-Process Depth of Field." GPU Gems 3. Upper Saddle River, NJ: Addison-Wesley, 2008.
Nimeroff, J., et al., "Efficient rendering of naturally illuminatied environments" in Fifth Eurographics Workshop on Rendering, 359-373, 1994.
Nokia, "City Lens", May 2012.
Ogden, J., "Pyramid-Based Computer Graphics", 1985.
Okano et al., "Three-dimensional video system based on integral photography" Optical Engineering, Jun. 1999. vol. 38, No. 6, pp. 1072-1077.
Orzan, Alexandrina, et al., "Diffusion Curves: A Vector Representation for Smooth-Shaded Images," ACM Transactions on Graphics—Proceedings of SIGGRAPH 2008; vol. 27; 2008.
Pain, B., "Back-Side Illumination Technology for SOI-CMOS Image Sensors", 2009.
Perez, Patrick et al., "Poisson Image Editing," ACM Transactions on Graphics—Proceedings of ACM SIGGRAPH 2003; vol. 22, Issue 3; Jul. 2003; pp. 313-318.
Petschnigg, George, et al., "Digial Photography with Flash and No-Flash Image Pairs", SIGGRAPH 2004.
Primesense, "The Primesense 3D Awareness Sensor", 2007.
Ramamoorthi, R., et al, "Frequency space environment map rendering" ACM Transactions on Graphics (SIGGRAPH 2002 proceedings) 21, 3, 517-526.

(56) References Cited

OTHER PUBLICATIONS

Ramamoorthi, R., et al., "An efficient representation for irradiance environment maps", in Proceedings of SIGGRAPH 2001, 497-500.
Raskar, Ramesh et al., "Glare Aware Photography: 4D Ray Sampling for Reducing Glare Effects of Camera Lenses," ACM Transactions on Graphics—Proceedings of ACM SIGGRAPH, Aug. 2008; vol. 27, Issue 3; pp. 1-10.
Raskar, Ramesh et al., "Non-photorealistic Camera: Depth Edge Detection and Stylized Rendering using Multi-Flash Imaging", SIGGRAPH 2004.
Raytrix, "Raytrix Lightfield Camera," Raytrix GmbH, Germany 2012, pp. 1-35.
Roper Scientific, Germany "Fiber Optics," 2012.
Scharstein, Daniel, et al., "High-Accuracy Stereo Depth Maps Using Structured Light," CVPR'03 Proceedings of the 2003 IEEE Computer Society, pp. 195-202.
Schirmacher, H. et al., "High-Quality Interactive Lumigraph Rendering Through Warping," May 2000, Graphics Interface 2000.
Shade, Jonathan, et al., "Layered Depth Images", SIGGRAPH 98, pp. 1-2.
Shreiner, OpenGL Programming Guide, 7th edition, Chapter 8, 2010.
Simpleviewer, "Tiltview", http://simpleviewer.net/tiltviewer. Retrieved Jan. 2013.
Skodras, A. et al., "The JPEG 2000 Still Image Compression Standard," Sep. 2001, IEEE Signal Processing Magazine, pp. 36-58.
Sloan, P., et al., "Precomputed radiance transfer for real-time rendering in dynamic, low-frequency lighting environments", ACM Transactions on Graphics 21, 3, 527-536, 2002.
Snavely, Noah, et al., "Photo-tourism: Exploring Photo collections in 3D", ACM Transactions on Graphics (SIGGRAPH Proceedings), 2006.
Sokolov, "Autostereoscopy and Integral Photography by Professor Lippmann's Method" , 1911, pp. 23-29.
Sony Corp, "Interchangeable Lens Digital Camera Handbook", 2011.
Sony, Sony's First Curved Sensor Photo: http://www.engadget.com; Jul. 2014.
Stensvold, M., "Hybrid AF: A New Approach to Autofocus Is Emerging for both Still and Video", Digital Photo Magazine, Nov. 13, 2012.
Story, D., "The Future of Photography", Optics Electronics, Oct. 2008.
Sun, Jian, et al., "Stereo Matching Using Belief Propagation", 2002.
Tagging photos on Flickr, Facebook and other online photo sharing sites (see, for example, http://support.gnip.com/customer/portal/articles/809309-flickr-geo-photos-tag-search). Retrieved Jan. 2013.
Takahashi, Keita, et al., "All in-focus View Synthesis from Under-Sampled Light Fields", ICAT 2003, Tokyo, Japan.
Tanida et al., "Thin observation module by bound optics (TOMBO): concept and experimental verification" Applied Optics 40, 11 (Apr. 10, 2001), pp. 1806-1813.
Tao, Michael, et al., "Depth from Combining Defocus and Correspondence Using Light-Field Cameras", Dec. 2013.
Techcrunch, "Coolinis", Retrieved Jan. 2013.
Teo, P., et al., "Efficient linear rendering for interactive light design", Tech. Rep. STAN-CS-TN-97-60, 1998, Stanford University.
Teranishi, N. "Evolution of Optical Structure in Images Sensors," Electron Devices Meeting (IEDM) 2012 IEEE International; Dec. 10-13, 2012.
Vaish et al., "Using plane + parallax for calibrating dense camera arrays", In Proceedings CVPR 2004, pp. 2-9.
Vaish, V., et al., "Synthetic Aperture Focusing Using a Shear-Warp Factorization of the Viewing Transform," Workshop on Advanced 3D Imaging for Safety and Security (in conjunction with CVPR 2005), 2005.
VR Playhouse, "The Surrogate," http://www.vrplayhouse.com/the-surrogate.
Wanner, S. et al., "Globally Consistent Depth Labeling of 4D Light Fields," IEEE Conference on Computer Vision and Pattern Recognition, 2012.
Wanner, S. et al., "Variational Light Field Analysis for Disparity Estimation and Super-Resolution," IEEE Transacations on Pattern Analysis and Machine Intellegence, 2013.
Wenger, et al, "Performance Relighting and Reflectance Transformation with Time-Multiplexed Illumination", Institute for Creative Technologies, SIGGRAPH 2005.
Wetzstein, Gordon, et al., "Sensor Saturation in Fourier Multiplexed Imaging", IEEE Conference on Computer Vision and Pattern Recognition (2010).
Wikipedia—Adaptive Optics: http://en.wikipedia.org/wiki/adaptive_optics. Retrieved Feb. 2014.
Wikipedia—Autofocus systems and methods: http://en.wikipedia.org/wiki/Autofocus. Retrieved Jan. 2013.
Wikipedia—Bayer Filter: http:/en.wikipedia.org/wiki/Bayer_filter. Retrieved Jun. 20, 2013.
Wikipedia—Color Image Pipeline: http://en.wikipedia.org/wiki/color_image_pipeline. Retrieved Jan. 15, 2014.
Wikipedia—Compression standard JPEG XR: http://en.wikipedia.org/wiki/JPEG_XR. Retrieved Jan. 2013.
Wikipedia—CYGM Filter: http://en.wikipedia.org/wiki/CYGM_filter. Retrieved Jun. 20, 2013.
Meng, J. et al., "An Approach on Hardware Design for Computational Photography Applications Based on Light Field Refocusing Algorithm," Nov. 18, 2007, 12 pages.

* cited by examiner

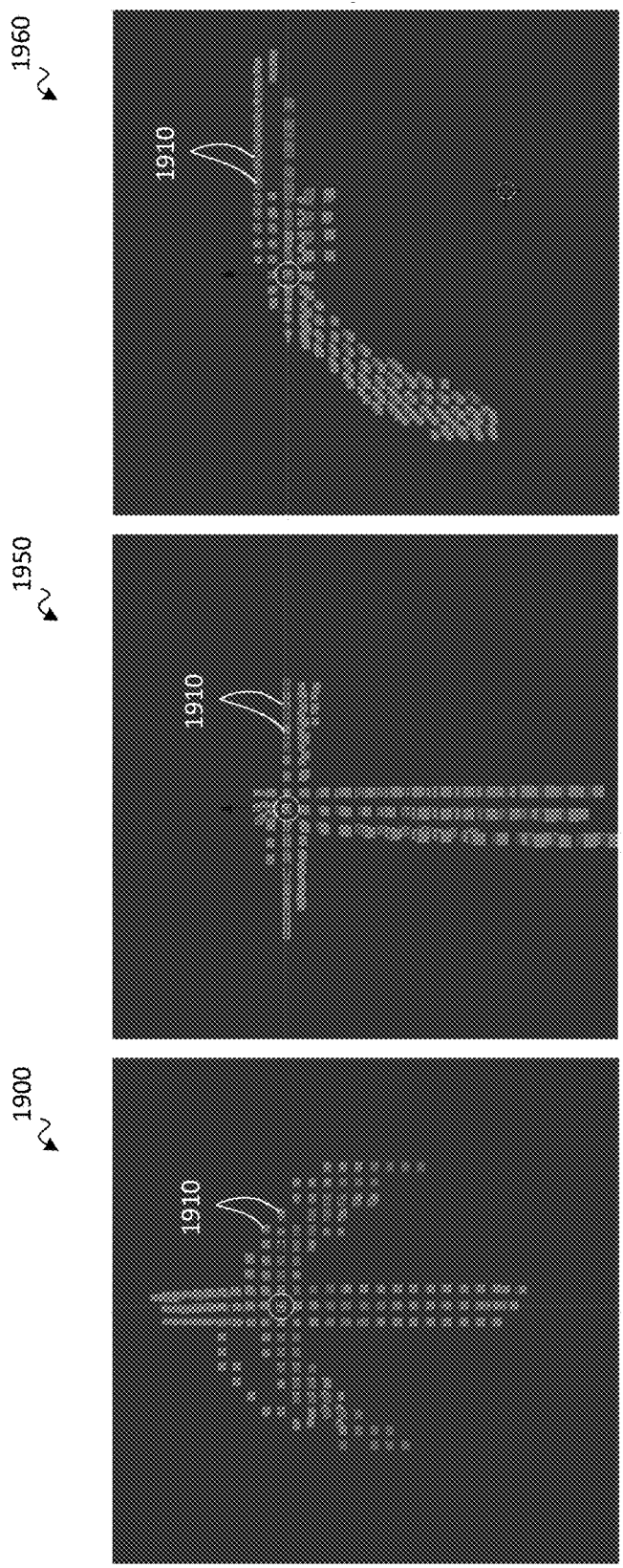

GENERATION OF VIRTUAL REALITY WITH 6 DEGREES OF FREEDOM FROM LIMITED VIEWER DATA

CROSS-REFERENCE TO RELATED APPLICATIONS

The present application is a continuation-in-part of U.S. application Ser. No. 15/590,841 for "Vantage Generation and Interactive Playback,", filed on May 9, 2017, the disclosure of which is incorporated herein by reference in its entirety.

The present application is related to U.S. application Ser. No. 15/590,808 for "Adaptive Control for Immersive Experience Delivery,", filed on May 9, 2017, the disclosure of which is incorporated herein by reference in its entirety.

The present application is also related to U.S. application Ser. No. 15/590,877 for "Spatial Random Access Enabled Video System with a Three-Dimensional Viewing Volume,", filed on May 9, 2017, the disclosure of which is incorporated herein by reference in its entirety.

The present application is also related to U.S. application Ser. No. 15/590,951 for "Wedge-Based Light-Field Video Capture,", filed on May 9, 2017, the disclosure of which is incorporated herein by reference in its entirety.

The present application is also related to U.S. application Ser. No. 14/837,465, for "Depth-Based Application of Image Effects,", filed Aug. 27, 2015 and issued on May 2, 2017 as U.S. Pat. No. 9,639,945, the disclosure of which is incorporated herein by reference in its entirety.

The present application is also related to U.S. application Ser. No. 14/834,924, for "Active Illumination for Enhanced Depth Map Generation,", filed Aug. 25, 2015, the disclosure of which is incorporated herein by reference in its entirety.

TECHNICAL FIELD

The present document relates to provision of a virtual reality or augmented reality experience with input having limited degrees of freedom.

BACKGROUND

The most immersive virtual reality and augmented reality experiences have six degrees of freedom, parallax, and view-dependent lighting. Generating viewpoint video for the user directly from the captured video data can be computationally intensive, resulting in a viewing experience with lag that detracts from the immersive character of the experience. Many dedicated virtual reality headsets have sensors that are capable of sensing the position and orientation of the viewer's head, with three dimensions for each, for a total of six degrees of freedom (6DOF).

However, use of mobile phones for virtual reality is becoming increasingly popular. Many mobile phones are designed to detect orientation, but lack the hardware to detect position with any accuracy. Accordingly, the viewer may feel constrained, as the system may be incapable of responding to changes in the position of his or her head.

SUMMARY

Various embodiments of the described system and method facilitate the presentation of virtual reality or augmented reality on devices with limited (i.e., fewer than six) degrees of freedom. In some embodiments, a virtual reality or augmented reality experience may be presented for a viewer through the use of input including only three degrees of freedom, which may be received from a first input device in the form of smartphone or other device that does not directly detect the position of the viewer's head. Rather, the input may include only orientation data indicative of a viewer orientation at which the viewer's head is oriented. The viewer orientation may be mapped to an estimated viewer location. Viewpoint video of a scene may be generated as viewed from a virtual viewpoint with a virtual location corresponding to the estimated viewer location, from along the viewer orientation. The viewpoint video may be displayed for the viewer.

In some embodiments, mapping may be carried out by defining a ray at the viewer orientation, locating an intersection of the ray with a three-dimensional shape, and, based on a location of the intersection, generating the estimated viewer location. The shape may optionally be generally spherical.

Prior to providing the virtual reality or augmented reality experience, a second input device, such as a dedicated virtual reality headset that provides input with six degrees of freedom, may be used to generate calibration data for each of a plurality of calibration orientations of the viewer's head. The calibration data may indicate a calibration viewer orientation at which the viewer's head is oriented, and a calibration viewer position at which the viewer's head is positioned. For each of the calibration positions, the calibration viewer orientation and the calibration viewer position may be used to project a point. The three-dimensional shape may be defined based on locations of the points.

If desired, the three-dimensional shape may be stored in connection with an identity of the viewer. Each viewer may optionally have his or her own customized shape for mapping a viewer orientation to an estimated viewer location.

In some embodiments, the virtual reality or augmented reality experience may be generated based on a video stream captured from multiple viewpoints. Thus, prior to generating the viewpoint video, the video stream may be captured by an image capture device. Generating the viewpoint video may include using at least part of the video stream.

Vantage architecture may be optionally be used. Thus, prior to generation of the viewpoint video, a plurality of locations, distributed throughout a viewing volume, may be designated, at which a plurality of vantages are to be positioned to facilitate viewing of the scene from proximate the locations. For each of the locations, a plurality of images of the scene, captured from viewpoints proximate the location, may be retrieved. The images may be combined to generate a combined image to generate a vantage. Each of the vantages may be stored in a data store. Thus, retrieving at least part of the video stream may include retrieving at least a subset of the vantages, and using the subset to generate the viewpoint video.

Prior to retrieving the subset of the vantages, the subset may be identified based on proximity of the vantages to the subset to the virtual viewpoint. Using the vantages to generate the viewpoint video may include reprojecting at least portions of the combined images of the subset of the vantages to the virtual viewpoint.

BRIEF DESCRIPTION OF THE DRAWINGS

The accompanying drawings illustrate several embodiments. Together with the description, they serve to explain the principles of the embodiments. One skilled in the art will

FIGS. 19A, 19B, and 19C are a plan view, a front elevation view, and a side elevation view, respectively, of points plotted from calibration data received from a viewer, according to one embodiment.

DETAILED DESCRIPTION

Figure 1:
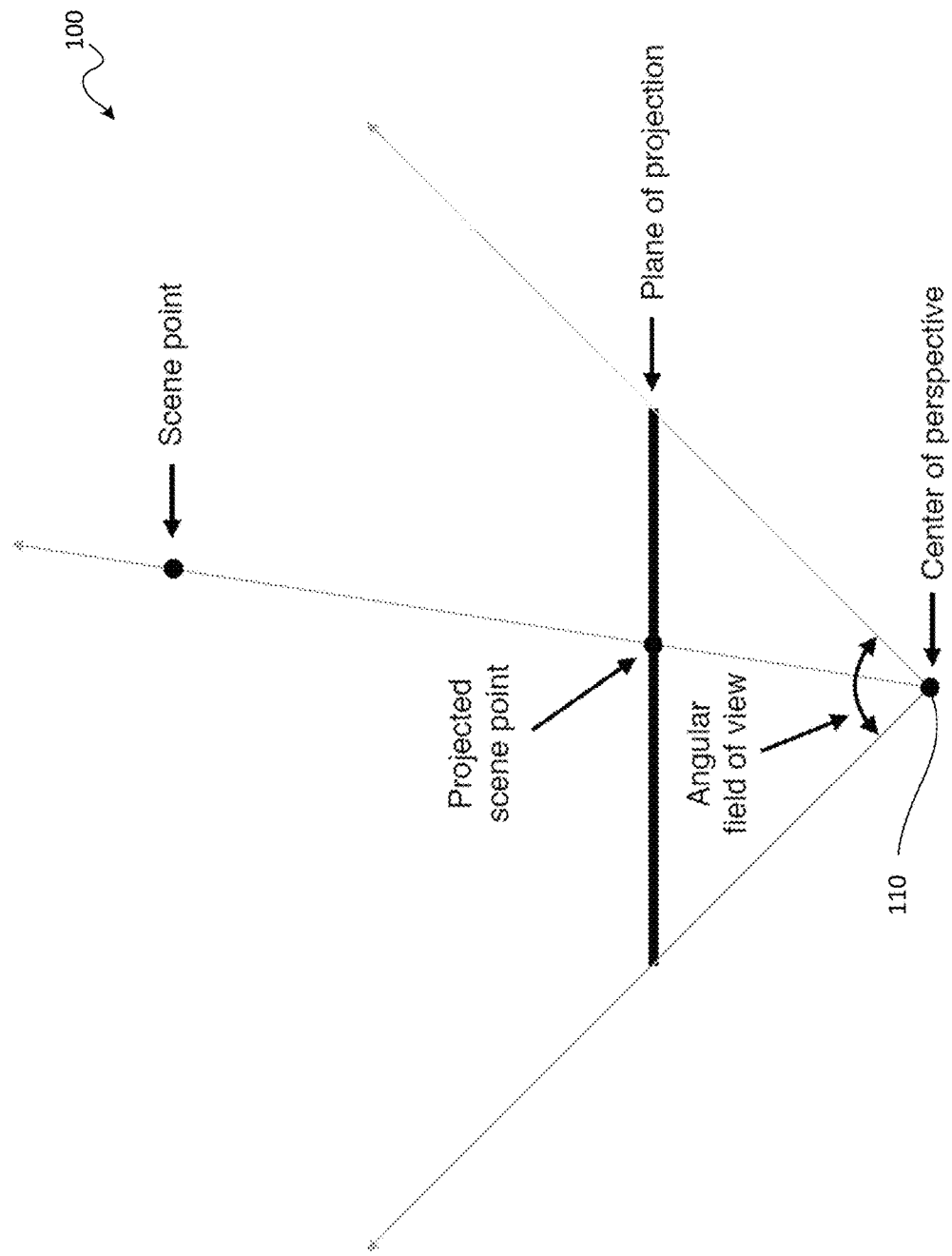
FIG. 1 is a diagram depicting planar projection according to one embodiment.

Multiple methods for capturing image and/or video data in a light-field volume and creating virtual views from such data are described. The described embodiments may provide for capturing continuous or nearly continuous light-field data from many or all directions facing away from the capture system, which may enable the generation of virtual views that are more accurate and/or allow viewers greater viewing freedom.

Definitions

For purposes of the description provided herein, the following definitions are used:
3DoF device: a virtual reality viewing device that only tracks the viewer orientation, and not the viewer position.
6DoF device: a virtual reality viewing device that tracks both the viewer orientation and the viewer position.
Augmented reality: an immersive viewing experience in which images presented to the viewer are based on the location and/or orientation of the viewer's head and/or eyes, and are presented in conjunction with the viewer's view of actual objects in the viewer's environment.
Calibration data: data that can be used to calibrate a device such as a virtual reality viewing device to prepare it for use in a virtual reality or augmented reality experience.
Center of perspective: The three-dimensional point from which rays may be extended through a surface of projection to points in a three-dimensional scene.
Combined image: an image such as an RGB or RGBD image generated by combining pixels from multiple source images.
Degrees of Freedom (DoF): the number of axes along which a viewer's viewpoint can translate, added to the number axes about which the viewer's viewpoint can rotate, in a virtual reality or augmented reality experience.
Depth: a representation of distance between an object and/or corresponding image sample and the entrance pupil of the optics of the capture system.
Estimated viewer position or estimated viewer location: an estimate of the location of the viewer's head (e.g., the point midway between the viewer's eyes), obtained not from direct measurement, but from other information such as the viewer orientation.
Eye image: An RGB (or RGBD) image that has been interactively computed for one of the viewer's eyes, taking into account the position and/or orientation of the viewer's head.
Head position or head location: the location, in 3D space, of a point midway between a viewer's eyes.
Head rotation parallax: movement of the head position (i.e., the point midway between the viewer's eyes) caused by the manner in which the viewer's neck and head move when he or she turns his or her head to a new orientation.
HMD: Head-mounted display.
Image: a two-dimensional array of pixel values, or pixels, each specifying a value pertinent to that location of the image, such as hue, luminance, saturation, and/or depth. The pixels of an image may be interpreted as samples of a continuous two-dimensional function on the image plane. Each pixel has a two-dimensional position, typically its center, which defines the location of its sample in the image plane.
Input device: any device that receives input from a user.
Main lens, or "objective lens": a lens or set of lenses that directs light from a scene toward an image sensor.
Mapping: using a known quantity, such as a viewer orientation, to obtain a previously unknown quantity, such as an estimated viewer position.
Planar image: An image whose pixel values are computed by planar projection.
Planar projection: A mapping of points in a three-dimensional scene onto a flat, two-dimensional surface.

Depending on where the projection plane is placed, the two-dimensional surface point that is the projection of a three-dimensional scene point may be the intersection point of the surface with the ray that extends from the center of perspective through the three-dimensional scene point, or the projection of the three-dimensional scene point back through the center-of-perspective.

Plane of projection: The two-dimensional surface of a planar projection.

Processor: any processing device capable of processing digital data, which may be a microprocessor, ASIC, FPGA, or other type of processing device.

Ray: a vector, which may represent light, a view orientation, or the like.

Reprojected image: An RGBD image that is a reprojection of another source RGBD image.

Reprojection: The process of computing the sample values of a (reprojected) image from the sample values of a different (source) image whose center of perspective is generally not at the same three-dimensional position. This is a reprojection in the sense that the source image is itself a projection, and that the computed image is being computed from the source image, rather than by direct projection from the scene.

Reprojection angle: The angle between the source ray (from the source center of perspective to the scene point) and the reprojection ray (from the scene point to the reprojection center of perspective).

RGBD image (or RGBD image): Usually an RGBD planar image.

RGBD planar image (or RGBD image): An image whose pixels include both color and depth information. The color information may be encoded as independent red, green, and blue values (the RGB values) or may have a different encoding. The depth values may encode, for each sample, the distance from the center of perspective to the scene point whose projection resulted in the sample's color value.

Scene: an arrangement of objects and/or people to be filmed.

Sensor, "photosensor," or "image sensor": a light detector in a camera capable of generating images based on light received by the sensor.

Source image: An RGBD image that is being reprojected.

Stereo virtual reality: an extended form of virtual reality in which each eye is shown a different view of the virtual world, enabling stereoscopic three-dimensional perception.

Vantage: a portion of video data, such as an RGBD image, that exists as part of multiple portions of video data at centers of perspective distributed through a viewing volume.

Video data: a collection of data comprising imagery and/or audio components that capture a scene.

Viewer orientation, or viewer head orientation: the direction along which a viewer is currently looking.

Viewer position, viewer location, or viewer head location: the position of the viewer's head (i.e., the point midway between the viewer's eyes) in 3D space.

Viewing volume: a three-dimensional region from within which virtual views of a scene may be generated.

Viewpoint video: imagery and/or sound comprising one or more virtual views.

Virtual reality: an immersive viewing experience in which images presented to the viewer are based on the location and/or orientation of the viewer's head and/or eyes.

Virtual view: a reconstructed view, typically for display in a virtual reality or augmented reality headset, which may be generated by resampling and/or interpolating data from a captured light-field volume.

Virtual viewpoint: the location, within a coordinate system and/or light-field volume, from which a virtual view is generated.

Volumetric content: virtual reality or augmented reality content that can be viewed from within a viewing volume.

In addition, for ease of nomenclature, the term "camera" is used herein to refer to an image capture device or other data acquisition device. Such a data acquisition device can be any device or system for acquiring, recording, measuring, estimating, determining and/or computing data representative of a scene, including but not limited to two-dimensional image data, three-dimensional image data, and/or light-field data. Such a data acquisition device may include optics, sensors, and image processing electronics for acquiring data representative of a scene, using techniques that are well known in the art. One skilled in the art will recognize that many types of data acquisition devices can be used in connection with the present disclosure, and that the disclosure is not limited to cameras. Thus, the use of the term "camera" herein is intended to be illustrative and exemplary, but should not be considered to limit the scope of the disclosure. Specifically, any use of such term herein should be considered to refer to any suitable device for acquiring image data. Further, although the ensuing description focuses on video capture for use in virtual reality or augmented reality, the systems and methods described herein may be used in a much wider variety of video and/or imaging applications.

The phrase "virtual camera" refers to a designation of a position and/or orientation of a hypothetical camera from which a scene may be viewed. A virtual camera may, for example, be placed within a scene to mimic the actual position and/or orientation of a viewer's head, viewing the scene as part of a virtual reality or augmented reality experience.

Planar Projection

Projection may reduce information in a three-dimensional scene to information on a two-dimensional surface, and subsequently to sample values in a two-dimensional image. The information may include color, although any scene values may be projected. The surface may be flat, in which case the information on the surface corresponds directly to like-positioned pixels in the two-dimensional image. Alternatively, the projection surface may be curved, in which case the correspondence between surface values and image pixels may be more complex. Because planar projection is easier to depict and understand, it will be used in the following discussion of FIG. 1. However, the systems and methods set forth herein also function for images with non-planar projections as well. Thus, this discussion may be generalized to non-planar projections.

Referring to FIG. 1, a diagram 100 depicts planar projection, according to one embodiment. A camera (not shown) with high-quality optics and a relatively small aperture may be understood to capture a planar projection of the light reflecting off objects in a physical scene. The center of perspective 110 of this projection may be within the objective lens assembly, and may be understood to be the center of the entrance pupil (for purposes of analysis on the scene side of the lens) and of the exit pupil (for analysis on the sensor side of the lens). If the camera is carefully calibrated, distortions that cause the captured image to differ from that of an ideal planar projection may be substantially corrected through the use of various methods known in the art.

Color information may be computed for each pixel location in the camera-captured image through processing by a camera pipeline, as implemented in modern digital cameras and mobile devices. Depth information may also be computed for each pixel location in the camera-captured image. Certain digital cameras compute this information directly, for example by measuring the time of flight of photons from the scene object to the camera. If the camera does not provide pixel depths, they may be computed by evaluating the differences in apparent positions (the parallax) of scene points in multiple camera images with overlapping fields of view. Various depth computation systems and methods are set forth in U.S. application Ser. No. 14/837,465, for "Depth-Based Application of Image Effects,", filed Aug. 27, 2015 and issued on May 2, 2017 as U.S. Pat. No. 9,639,945, and U.S. application Ser. No. 14/834,924, for "Active Illumination for Enhanced Depth Map Generation,", filed Aug. 2, 2015, the disclosures of which are incorporated herein by reference in their entirety.

The results of processing a camera-captured image through a camera pipeline, and of computing pixel depths (if they are not provided by the camera), may be an RGB image or an RGBD image. Such images may encode both color and depth in each pixel. Color may be encoded as red, green, and blue values (RGB) or may have any other encoding. Depth may be encoded as metric distance or as normalized reciprocal distance (NWC depth), or with other encodings, and may further correspond to axial depth (measured perpendicular to the plane of projection) or as radial depth (measured along the ray from the center of perspective through the center of the pixel) or with other geometric measures.

Using the techniques of three-dimensional computer graphics, an RGBD image of a virtual scene may be computed with a virtual camera, substantially duplicating the operation of a physical camera in a physical scene (but without the requirement of correcting distortions from the ideal two-dimensional planar projection). The coordinates of scene points may be known during computer-graphic image generation, so pixel depths may be known directly, without requiring computation using multiple RGBD images or time-of-flight measurement.

Reprojection

As indicated previously, the goal may be interactive computation of eye images for viewpoint video for arbitrary positions and orientations. These eye images may be computed by direct projection from the scene, but the scene may no longer available. Thus, it may be necessary to compute the eye images from information in the RGBD camera images, a process that may be referred to as reprojection, because the RGBD camera images are themselves projections, and this step may involve computation of another projection from them.

Figure 2:
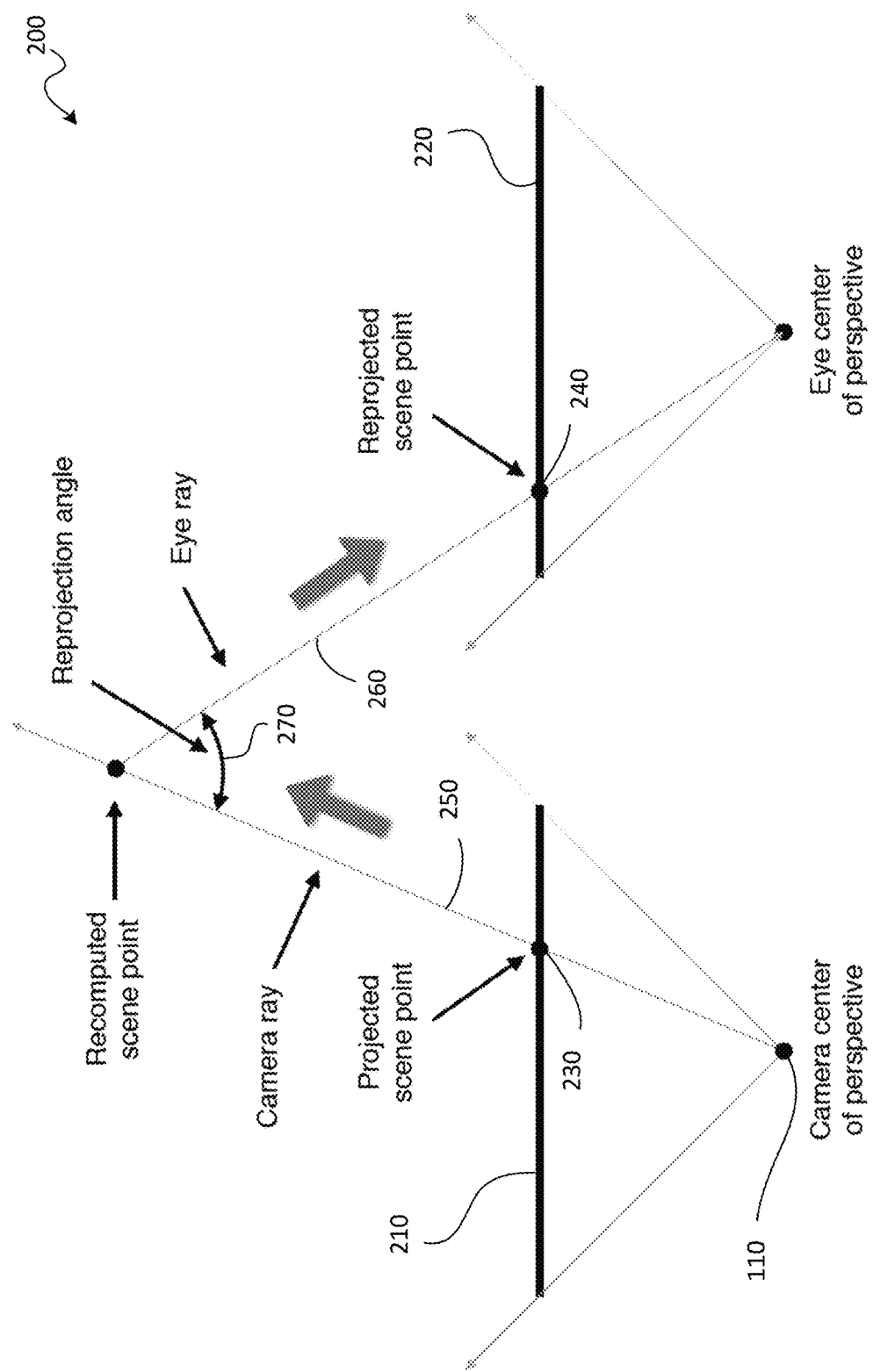
FIG. 2 is a diagram depicting planar reprojection according to one embodiment.

Referring to FIG. 2, a diagram 200 depicts planar reprojection, according to one embodiment. During reprojection, each pixel in a camera image 210 may be mapped to a corresponding location (typically not a pixel center) in the reprojected eye image 220. If both images are planar projections, this correspondence may be computed as a transformation that is specified by a 4×4 matrix, using the mathematics developed for 3-D computer graphics. Examples are set forth in *Computer Graphics, Principles and Practice*, 3rd edition, Addison Wesley, 2014. Geometrically, the correspondence may be established by first computing the reprojected scene point 240 that corresponds to a camera pixel 230 by following the ray 250 from the camera image's center of perspective 110, through the camera pixel's center, to the camera-pixel-specified distance, and then projecting that scene point to the eye image, as depicted in FIG. 2.

Figure 3:
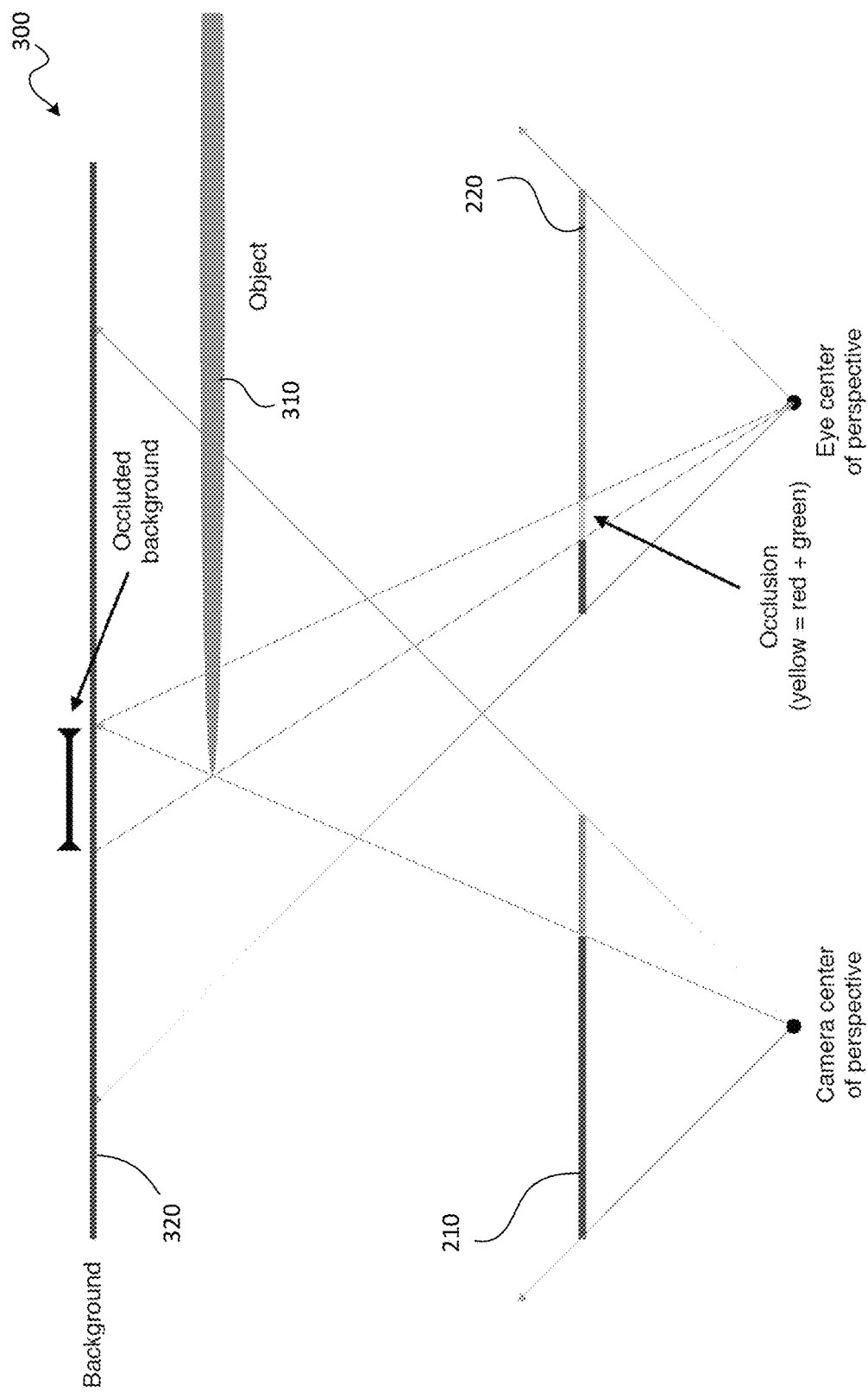
FIGS. 3, 4, and 5 are diagrams depicting occlusion and disocclusion, according to certain embodiments.
Figure 4:
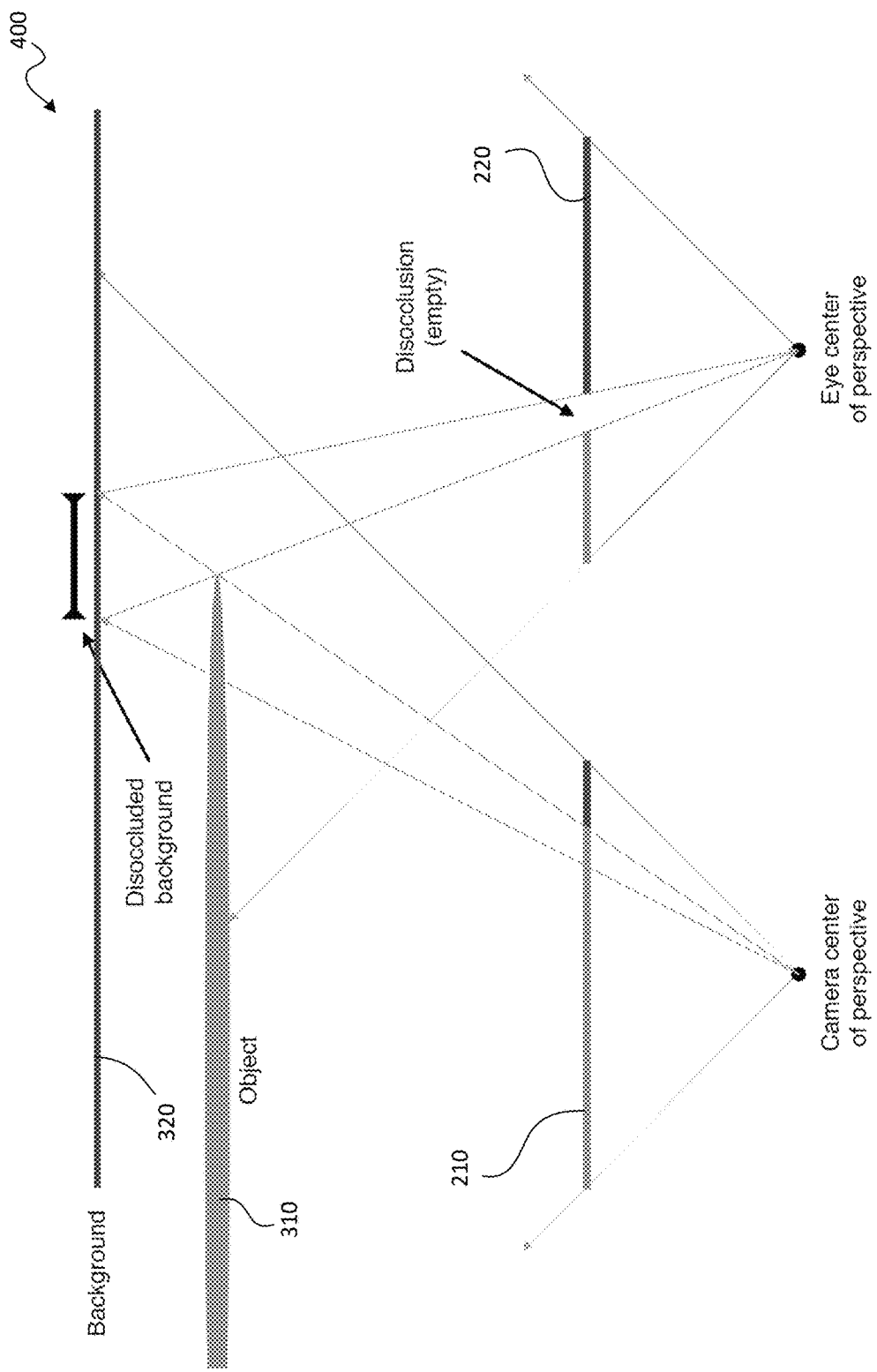
Figure 5:
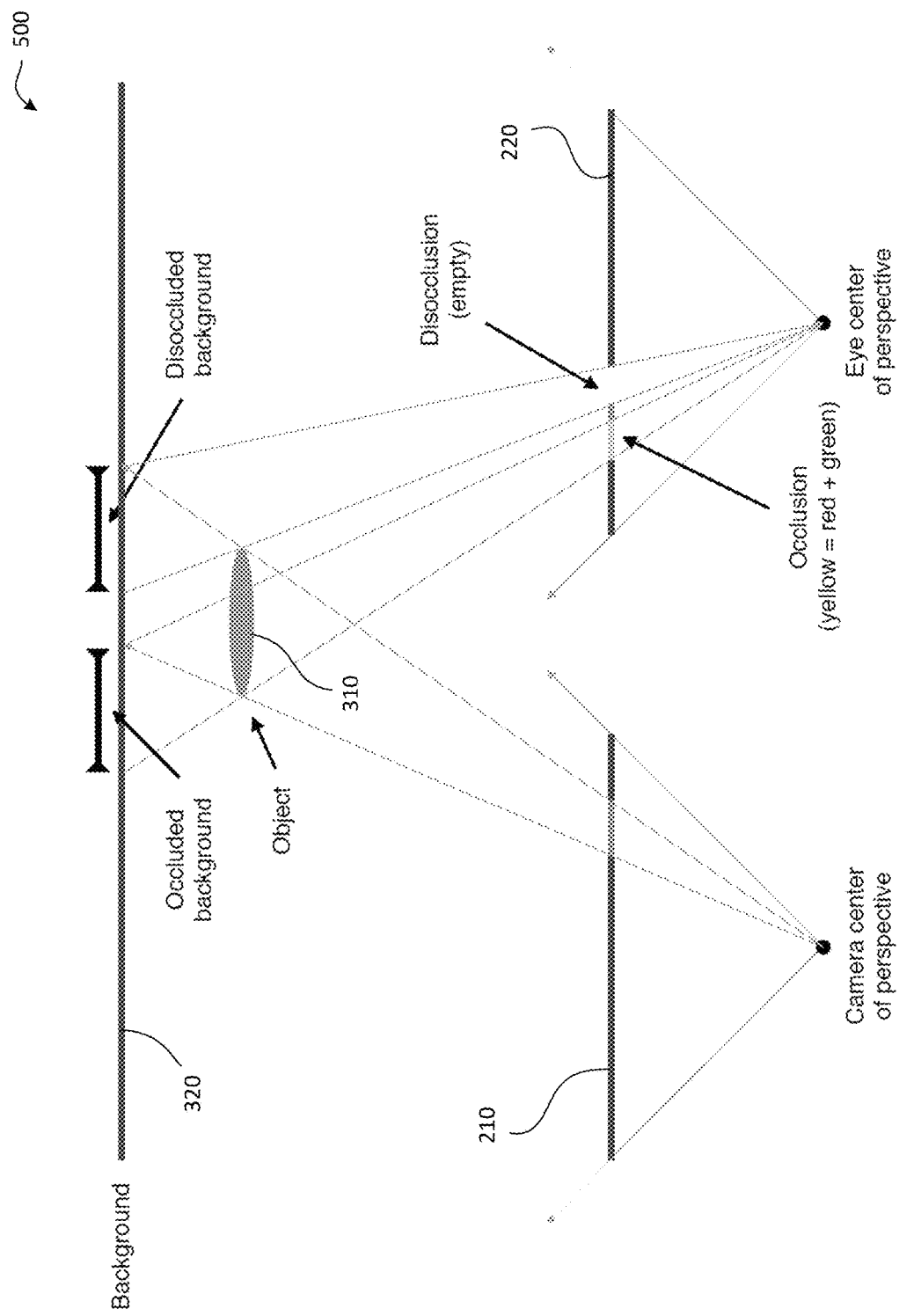

Referring to FIGS. 3, 4, and 5, diagrams 300, 400, and 500 depict occlusion and disocclusion, according to certain embodiments. With continued reference to FIGS. 6 and 7, the following challenges may be observed about the reprojection process:

Resampling. Corresponding points in the reprojected image may not be pixel centers, falling instead at arbitrary locations between pixels. The resampling that is required to compute pixel-center values from these corresponding points may be carried out through the use of various methods known in the art.

Unidirectionality. The correspondence may be obtainable only from the camera image to the eye image, and not backward from the eye image to the camera image. One reason for this is that pixels in the eye image may have no a priori depths, so reverse mapping may not be possible.

Occlusion. If there are substantial differences in the depths of pixels in the camera image, then multiple camera pixels may map to the same pixel in the eye image. The diagram 300 of FIG. 3 illustrates a simple example in which a nearer object 310 occludes a background 320, and the eye image 220 sees less of the background 320 than the camera image 210.

Disocclusion. Just as multiple camera pixels may map to an eye pixel, it is also possible that no pixels map to an eye pixel. The diagram 400 of FIG. 4 illustrates a simple example in which a nearer object 310 occludes a background 320, and the eye image 220 sees more of the background 320 than the camera image 210, or rather would see more of the background 320 than the camera image 210 if it were computed as a projection from the actual scene. Regions of eye pixels to which no camera pixels correspond may be referred to as disocclusions because they expose (disocclude) portions of the scene that were not visible in the images captured by the camera(s). A single scene object may cause both occlusion and disocclusion, as depicted in the diagram 500 of FIG. 5.

Image Formation by Reprojection

The challenges set forth above will be discussed in further detail below. In this discussion, the source (for example, RGBD) images and reprojected images will continue to be referred to as camera images and eye images, respectively.

Filling Disocclusions

Based on the discussion above, it can be seen that one difficulty in forming a complete eye image by reprojection is that the eye image formed by reprojecting a single camera image may have disocclusions. Of course objects that are not visible to one camera may be visible to another, so disocclusions may be filled by reprojecting multiple camera images. In this approach, each eye pixel may be computed from the set of non-occluded camera pixels that correspond to it.

Unfortunately, there is no guarantee that any camera-image pixels will map to a specific eye-image pixel. In other words, it is possible that a correctly formed eye-image includes a portion of the scene that no camera image sees. In this case, the values of disoccluded pixels may be inferred from the values of nearby pixels, a process that is known in the art as hallucination. Other approaches to assigning values (such as color and/or depth) to disoccluded pixels are possible.

Discarding Occluded Pixels

When multiple camera images are reprojected (perhaps to increase the likelihood of filling disocclusions by reprojection), the possibility increases that the set of camera pixels that map to an eye pixel will describe scene objects at more than one distance. Thus, pixels may be included that encode objects that are not visible to the eye. The pixel values in a correctly-formed eye image may advantageously avoid taking into account camera pixels that encode occluded objects; thus, it may be advantageous to identify and discard occluded pixels. Occluded pixels encode occluded scene objects, which are by definition farther from the eye than visible objects. Occluded pixels may therefore be identified by first computing, and then comparing, the depths of reprojected pixels. The computation may be geometrically obvious, and may be an automatic side effect of the transformation of three-dimensional points using 4×4 matrices.

Handling View-Dependent Shading

The apparent color of a point in three-dimensional space may vary depending on the position of the viewer, a phenomenon known as view-dependent shading in the field of three-dimensional computer graphics. Because the cameras in the capture rig have their centers of perspective at different positions, it follows that camera pixels that map to the same scene point may have different colors. So when multiple camera pixels map to the same eye pixel, the pixel selection process may advantageously consider view-dependent shading in addition to occlusion.

Except in the extreme case of a perfectly reflective object, view-dependent shading may result in mathematically continuous variation in apparent color as the view position is moved. Thus, pixels from a camera near the eye are more likely to correctly convey color than are pixels from cameras further from the eye. More precisely, for a specific eye pixel, the best camera pixel may be the non-occluded pixel that maps to that eye pixel and whose mapping has the smallest reprojection angle (the angle 270 between the camera ray 250 and the eye ray 260, as depicted in FIG. 2).

Achieving High Performance

To form a high-quality eye image, it may be advantageous to identify the best camera pixels and use them to compute each eye pixel. Unfortunately, the unidirectionality of reprojection, and the scene-dependent properties of occlusion and disocclusion, make it difficult to directly determine which camera image has the best pixel for a given eye pixel. Further, the properties of view-dependent shading make it certain that, for many view positions, the best camera pixels will be distributed among many of the camera images.

Figure 6:
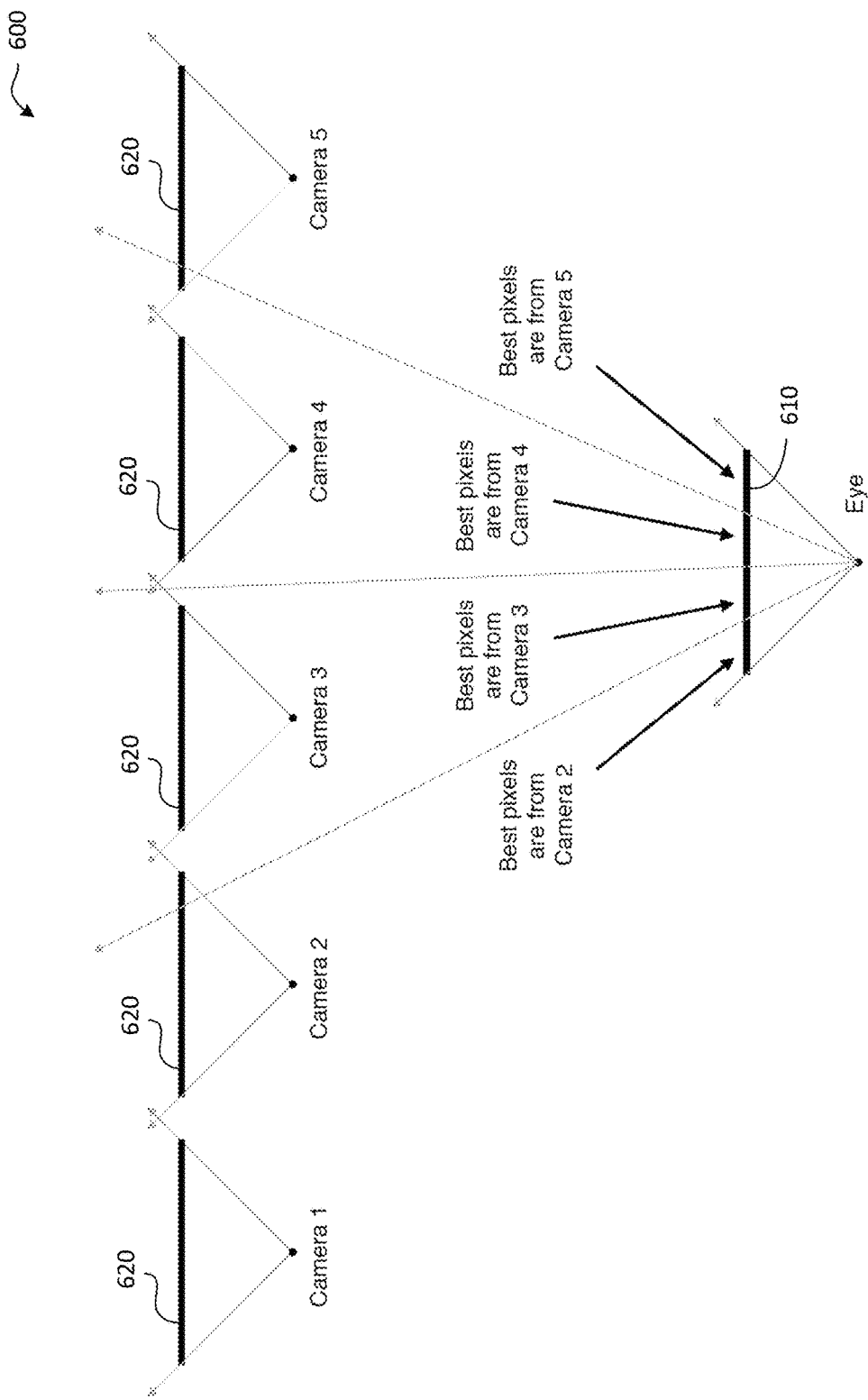
FIG. 6 is a diagram depicting the selection of the best pixels for an eye image computed as a combination of multiple camera images, according to one embodiment.

Referring to FIG. 6, a diagram 600 depicts the selection of the best pixels for an eye image 610 computed as a combination of multiple camera images 620, according to one embodiment. Multiple camera pixels from a substantial number of the camera images 620 may be reprojected and tested to identify which is best. This may make it challenging to maintain performance, as identification of the best pixel may be computationally intensive.

Vantages

Video data of an environment may be prepared for use in the presentation of an immersive experience, such as a virtual reality or augmented reality experience. Such an experience may have a designated viewing volume, relative to the environment, within which a viewer can freely position his or her head to view the environment from the corresponding position and viewing direction. The view generated for the viewer may be termed "viewpoint video." The goal may be to capture video of an environment, then to allow the viewer to enter and move around within a live playback of the captured scene, experiencing it as though he or she were present in the environment. Viewer motion may be arbitrary within a constrained volume called the viewing volume. The viewing experience is immersive, meaning that the viewer sees the environment from his or her position and orientation as though he or she were actually in the scene at that position and orientation.

The video data may be captured with a plurality of cameras, each attached to a capture rig such as a tiled camera array, with positions and orientations chosen such that the cameras' fields of view overlap within the desired capture field of view. The video data may be processed into an intermediate format to better support interactive playback. The viewer may wear a head-mounted display (HMD) such as the Oculus, which both tracks the viewer's head position and orientation, and facilitates the display of separately computed images to each eye at a high (e.g., 90 Hz) frame rate.

For playback to be immersive, the images presented to the viewer's eyes are ideally correct for both the position and orientation of his eyes. In general, the position and orientation of an eye will not match that of any camera, so it may be necessary to compute the eye's image from one or more camera images at position(s) and/or orientation(s) that are different from those of the eye. There are many challenges involved in the performance of these computations, or reprojections, as described previously, to generate views interactively and with sufficient quality. This disclosure outlines some of the challenges and identifies aspects of intermediate formats that may help to surmount them.

More specifically, in order to ensure that performance can be maintained in a manner that avoids disruption of the virtual reality or augmented reality experience as eye images are generated for viewpoint video, reprojection may be carried out twice. First, as a non-time-critical preprocessing step (before the experience is initiated), the camera images may be reprojected into vantages. Each vantage may include an RGBD image whose centers of perspective are distributed throughout the three-dimensional viewing volume. During this step, there is time to reproject as many camera images as necessary to find the best camera pixels for each vantage pixel.

Each of the vantages may be an image computed from the camera images. The vantages may have positions that are distributed throughout a 3D viewing volume. Viewpoint video can then be interactively computed from the vantages rather than directly from the camera images (or generally from images corresponding to the camera positions). Each vantage may represent a view of the environment from the corresponding location, and may thus be a reprojected image. Metadata may be added to the reprojection that defines each vantage; the metadata may include, for example, the location of the vantage in three-dimensional space.

Vantages may, in some embodiments, be evenly distributed throughout a viewing volume. In the alternative, the vantages may be unevenly distributed. For example, vantage density may be greater in portions of the viewing volume that are expected to be more likely to be visited and/or of greater interest to the viewer of the experience.

Reprojection of the video data into the vantages may also include color distribution adjustments. For example, in order to facilitate the proper display of view-dependent shading effects, the reprojected images that define the vantages may be adjusted such that each one has the closest possible position to the desired view-dependent shading. This may enable proper display of reflections, bright spots, and/or other shading aspects that vary based on the viewpoint from which the scene is viewed.

Vantages and tiles are also described in related U.S. application Ser. No. 15/590,877 for "Spatial Random Access Enabled Video System with a Three-Dimensional Viewing Volume,", filed on May 9, 2017, the disclosure of which is incorporated herein by reference in its entirety. One exemplary method for generating such vantages will be shown and described subsequently, in connection with FIG. 13.

Once all the vantages exist, eye images may be formed interactively (during the experience), reprojecting only the small number of vantages (for example, four) whose centers of perspective tightly surround the eye position. Vantages may be distributed throughout the viewing volume to ensure that such vantages exist for all eye positions within the viewing volume. Thus, all vantage pixels may provide accurate (if not ideal) view-dependent shading. By selecting vantages that surround the eye, it may be likely that at least one vantage "sees" farther behind simple occlusions (such as the edges of convex objects) than the eye does. Accordingly, disocclusions are likely to be filled in the eye images.

It may be desirable to reproject the viewpoint video from the vantages in such a manner that centers of perspective can be altered without jarring changes. As the viewer moves between vantages, the change in imagery should be gradual, unless there is a reason for a sudden change. Thus, it may be desirable to generate the viewpoint video as a function of the vantages at the vertices of a polyhedron. As the viewer's viewpoint moves close to one vertex of the polyhedron, that vantage may provide the bulk of the viewpoint video delivered to the viewer.

Moving within the polyhedron may cause the viewpoint video to contain a different mix of the vantages at the vertices of the polyhedron. Positioning the viewpoint on the face of the polyhedron may cause only the vantages on that face to be used in the calculation of the viewpoint video. As the viewpoint moves into a new polyhedron, the vantages of that polyhedron may be used to generate the viewpoint video. The viewpoint video may always be a linear combination of the vantages at the vertices of the polyhedron containing the viewpoint to be rendered. A linear interpolation, or "lerp" function may be used. Barycentric interpolation may additionally or alternatively be used for polyhedra that are tetrahedral or cuboid in shape. Other types of interpolation may be used for other types of space-filling polyhedra.

In some embodiments, in order to enable efficient identification of the four vantages that closely surround the eye, vantage positions may be specified as the vertices of a space-filling set of polyhedra in the form of tetrahedra. The tetrahedra may be sized to meet any desired upper bound on the distance of the eye from a surrounding vantage. While it is not possible to fill space with Platonic tetrahedra, many other three-dimensional tilings are possible. For example, the view volume may be tiled with regular cuboids, as depicted in FIG. 7.

Figure 7:
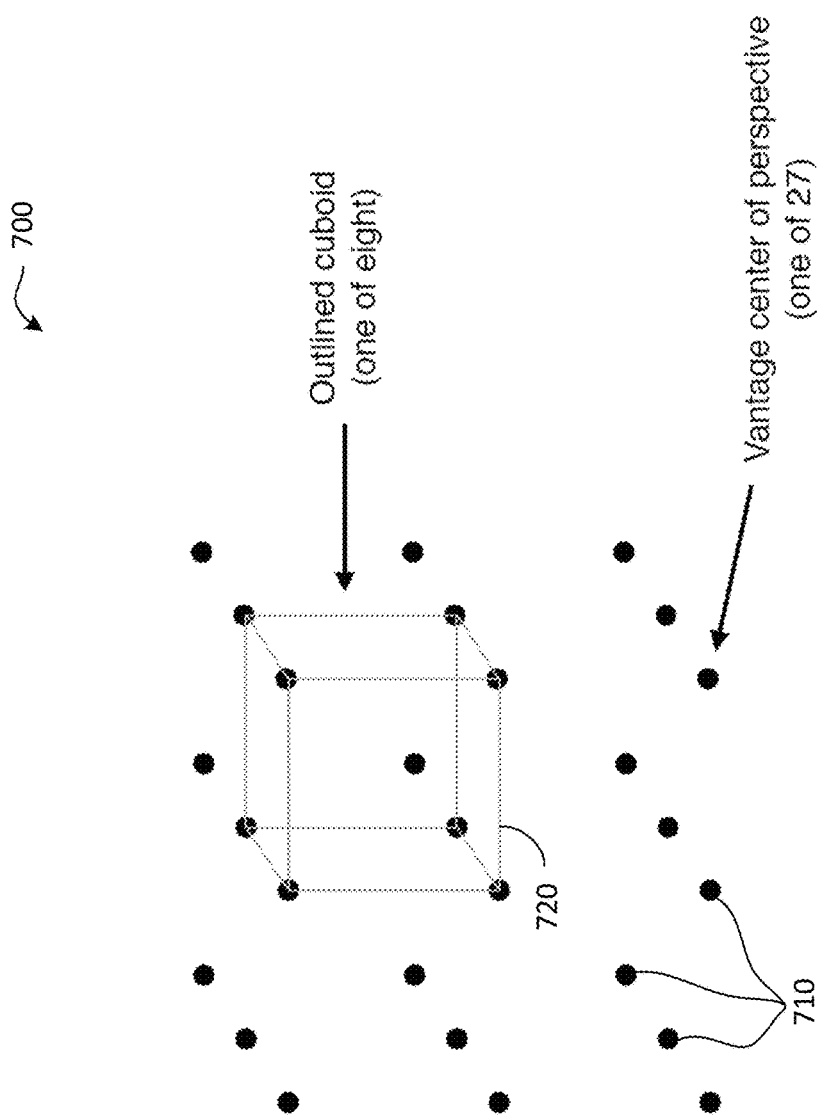
FIG. 7 is a diagram depicting a regular cuboid vantage distribution, according to one embodiment.

Referring to FIG. 7, a diagram 700 depicts a regular cuboid vantage distribution, according to one embodiment. Vantages 710 may be distributed such that groups of eight adjacent vantages 710 may cooperate to define the corners of a cube 720. Each cube 720 may then subdivided as depicted in FIG. 8.

Figure 8:
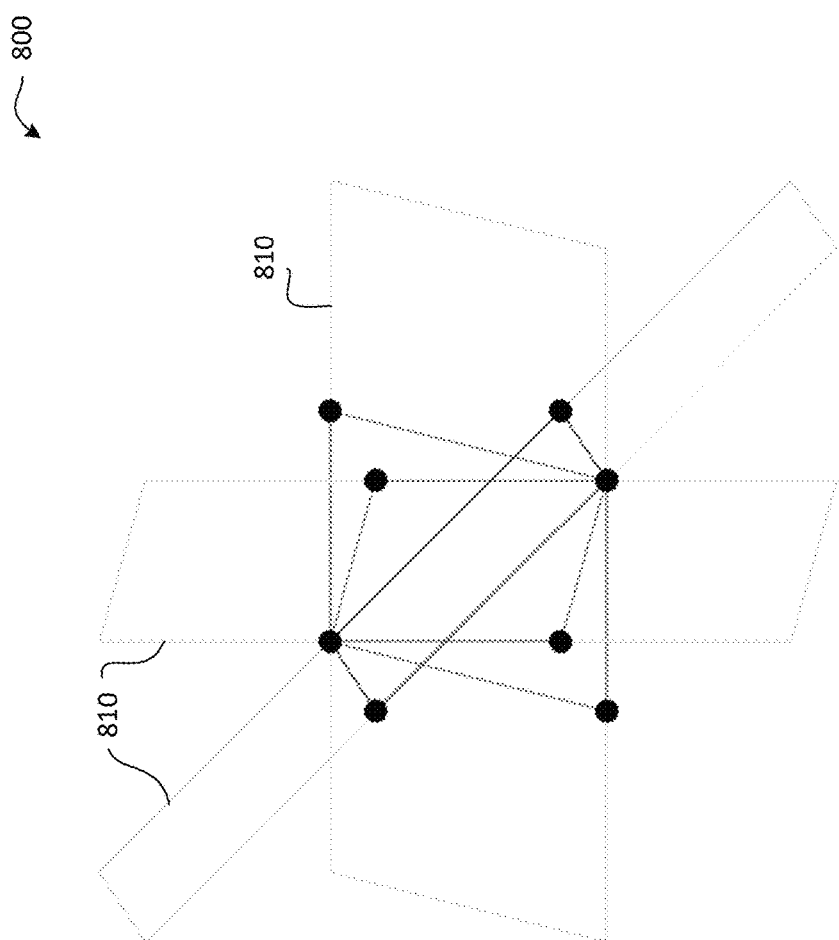
FIG. 8 is a diagram depicting the division of a cube as in FIG. 11 into tetrahedra through the use of three planes, according to one embodiment.

Referring to FIG. 8, a diagram 800 depicts the division of a cube 720 as in FIG. 7 through the use of three planes 810, according to one embodiment. Each of the planes 810 may pass through four vertices (i.e., four vantages 710) of the cube 720.

Figure 9:
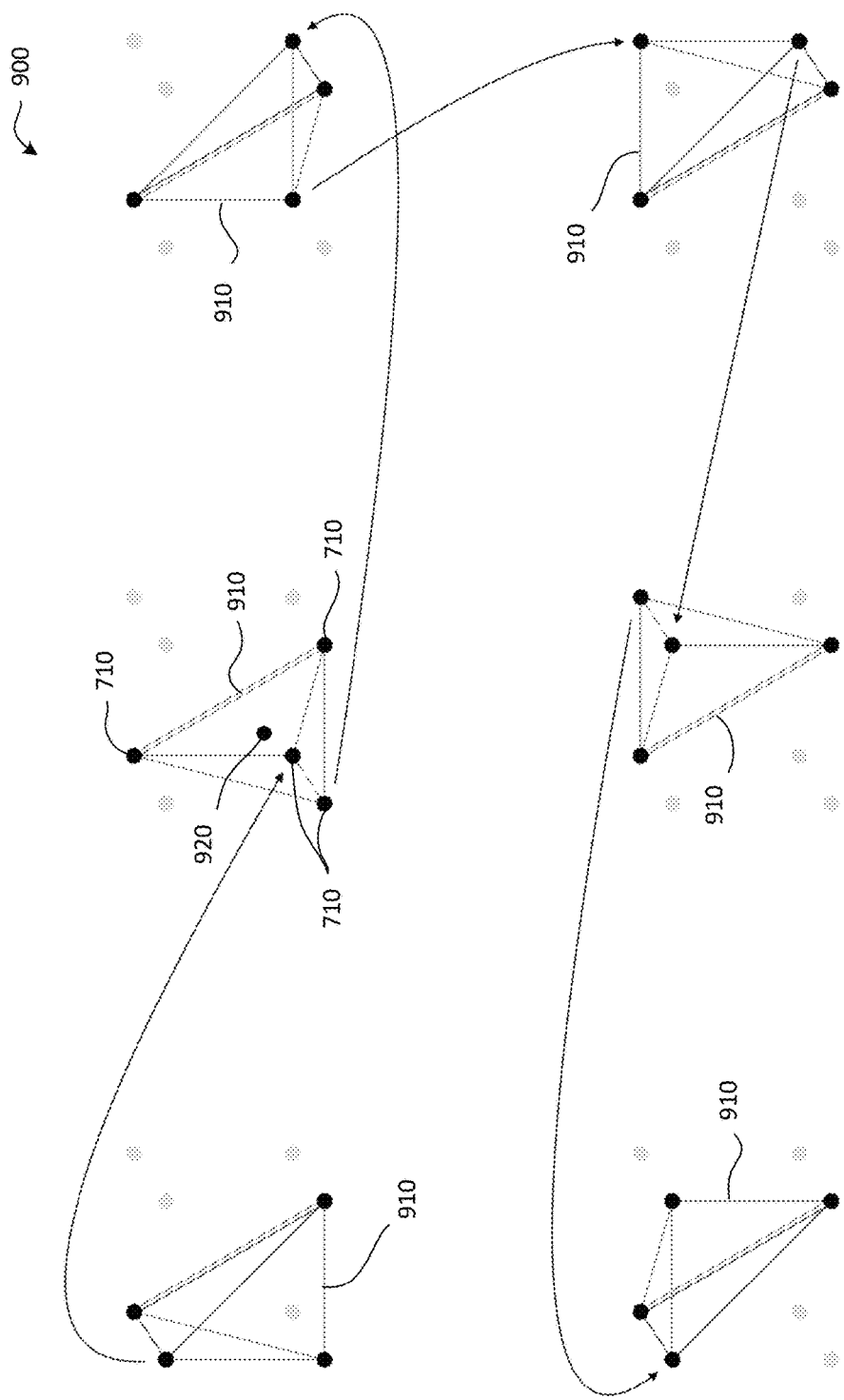
FIG. 9 is a diagram depicting the division of a cube as in FIG. 11 into six tetrahedra, according to one embodiment.

Referring to FIG. 9, a diagram 900 depicts the division of a cube 720 as in FIG. 7 into six tetrahedra 910, according to one embodiment. The tetrahedra 910 may share the vertices of the cube 720, which may be vantages as described above. The tetrahedra 910 may subdivide opposing faces of the cube 720 into the same pair of triangular facets. Eye images for a viewpoint 920 with one of the tetrahedra 910 may be rendered by reprojecting the images of the vantages 710 at the vertices of the tetrahedron.

It may be desirable for the tetrahedra 910 to match up at faces of the cube 720. This may be accomplished by either subdividing appropriately, or by reflecting the subdivision of the cube 720 at odd positions in each of the three dimensions. In some embodiments subdivisions that match at cuboid faces may better support Barycentric interpolation, which will be discussed subsequently, and is further set forth in Barycentric Coordinates for Convex Sets, Warren, J., Schaefer, S., Hirani, A. N. et al., Adv Comput Math (2007) 27:319.

In alternative embodiments, other polyhedra besides tetrahedra may be used to tile the viewing volume. Generally, such polyhedra may require that more vantages be at considered during eye image formation. For example, the cuboid tiling may be used directly, with a viewpoint within the cube 720 rendered based on reprojection of the vantages 710 at the corners of the cube 720. However, in such a case, eight vantages would need to be used to render the eye images. Accordingly, the use of tiled tetrahedra may provide computational advantages. In other embodiments, irregular spacing of polyhedral may be used. This may help reduce the number of vantages that need to be created and stored, but may also require additional computation to determine which of the polyhedra contains the viewer's current viewpoint.

A further benefit may be derived from polyhedral tiling. Barycentric interpolation may be used to compute the relative closeness of the eye position to each of the four surrounding vantages. These relative distances may be converted to weights used to linearly combine non-occluded vantage pixels at each eye pixel, rather than simply selecting the best among them. As known in the three-dimensional graphic arts, such linear combination (often referred to as lerping) may ensure that eye pixels change color smoothly, not suddenly, as the eye position is moved incrementally. This is true in a static scene and may remain approximately true when objects and lighting in the scene are dynamic.

Barycentric interpolation is particularly desirable because it is easy to compute and has properties that ensure smoothness as the eye position moves from one polyhedron to another. Specifically, when the eye is on a polyhedron facet, only the vertices that define that facet have non-zero weights. As a result, two polyhedra that share a facet may agree on all vertex weights because all but those at the facet vertices may be zero, while those on the facet may be identical. Hence, there may be no sudden change in color as the viewer moves his or her eyes within the viewing volume, from one polyhedron to another.

Another property of Barycentric interpolation, however, is that when the eye is inside the polyhedron, rather than on a facet surface, all polyhedron vertex weights may be nonzero. Accordingly, all vantages may advantageously be reprojected and their pixels lerped to ensure continuity in color as the eye moves through the polyhedron. Thus performance may be optimized by tiling with the polyhedron that has the fewest vertices, which is the tetrahedron.

Non-Planar Projection

Cameras and eyes have fields of view that are much smaller than 180°. Accordingly, their images can be represented as planar projections. However, it may be desirable for vantages to have much larger fields of view, such as full 360°×180; it is not possible to represent images with such large fields of view as planar projections. Their surfaces of projection must be curved. Fortunately, all of the techniques described previously work equally well with non-planar projections.

Figure 10:
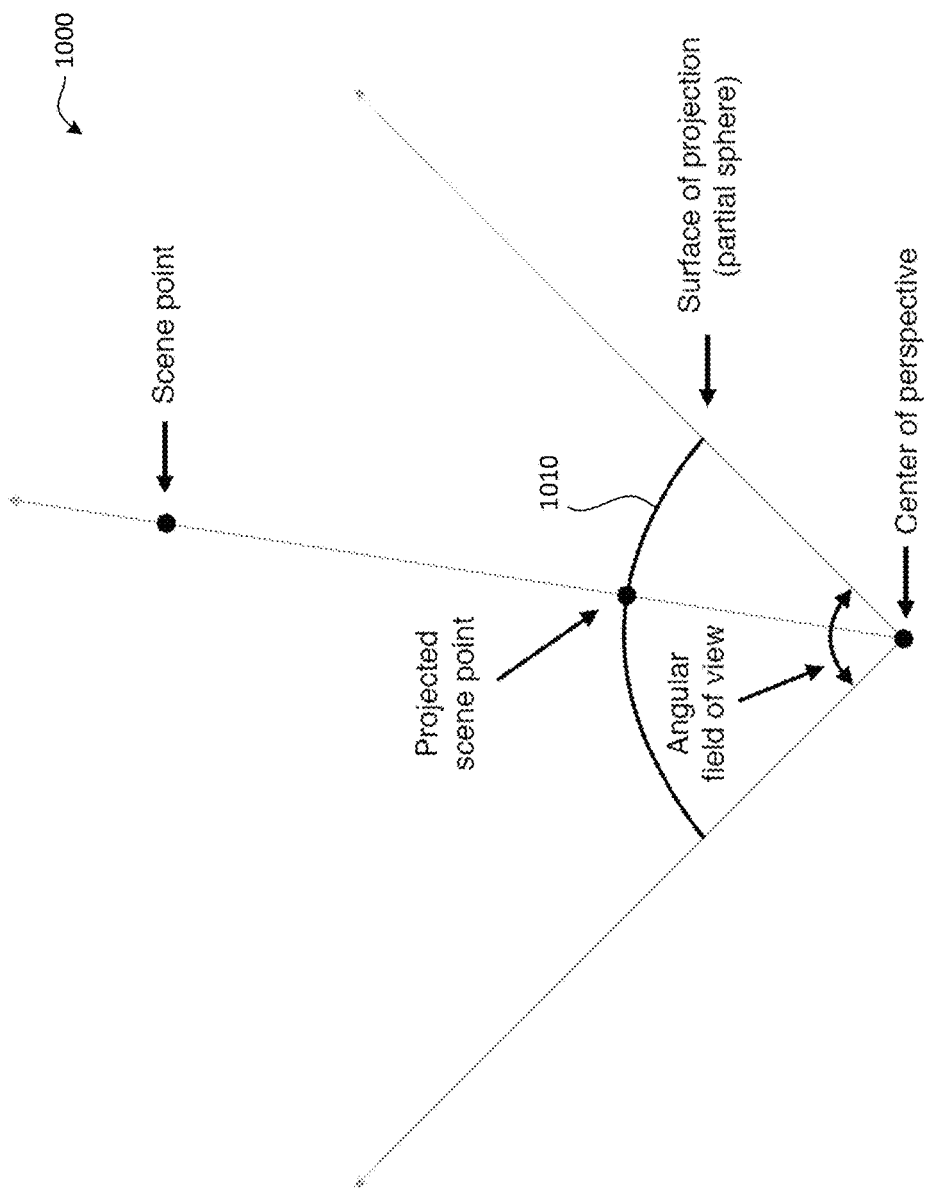
FIG. 10 is a diagram depicting projection to a curved surface, according to one embodiment.

Referring to FIG. 10, a diagram 1000 depicts projection to a curved surface 1010, according to one embodiment. The curved surface 1010 may be spherical. Because a sphere cannot be flattened onto a rectangle, a further distortion (e.g., an equirectangular distortion) may be needed to convert spherical projection coordinates to image coordinates. Such distortion may be carried out in the process of reprojecting the images to the three-dimensional shape.

Virtual Cameras and Scenes

Just as vantages may be created from images of a physical scene captured by a physical camera, they may also be created from images created by virtual cameras of a virtual scene, using the techniques of three-dimensional computer graphics. Vantages may be composed of physical images, virtual images, and/or a mixture of physical and virtual images. Any techniques known in the art for rendering and/or reprojecting a three-dimensional scene may be used. It is furthermore possible that vantages be rendered directly (or in any combination of reprojection and direct rendering) using virtual cameras, which may populate a three-dimensional volume without occluding each other's views of the virtual scene.

Center of Depth

As described thus far, depth values in an RGBD image may be measured relative to the center of perspective, such as the center of perspective 110 in FIG. 1. Specifically, radial depths may be measured from the center of perspective along the ray to the nearest scene point, and axial depths may be measured perpendicular to the plane of projection, from the plane that includes the center of perspective to the plane that includes the scene point. This will be shown and described in connection with FIG. 11.

Figure 11:
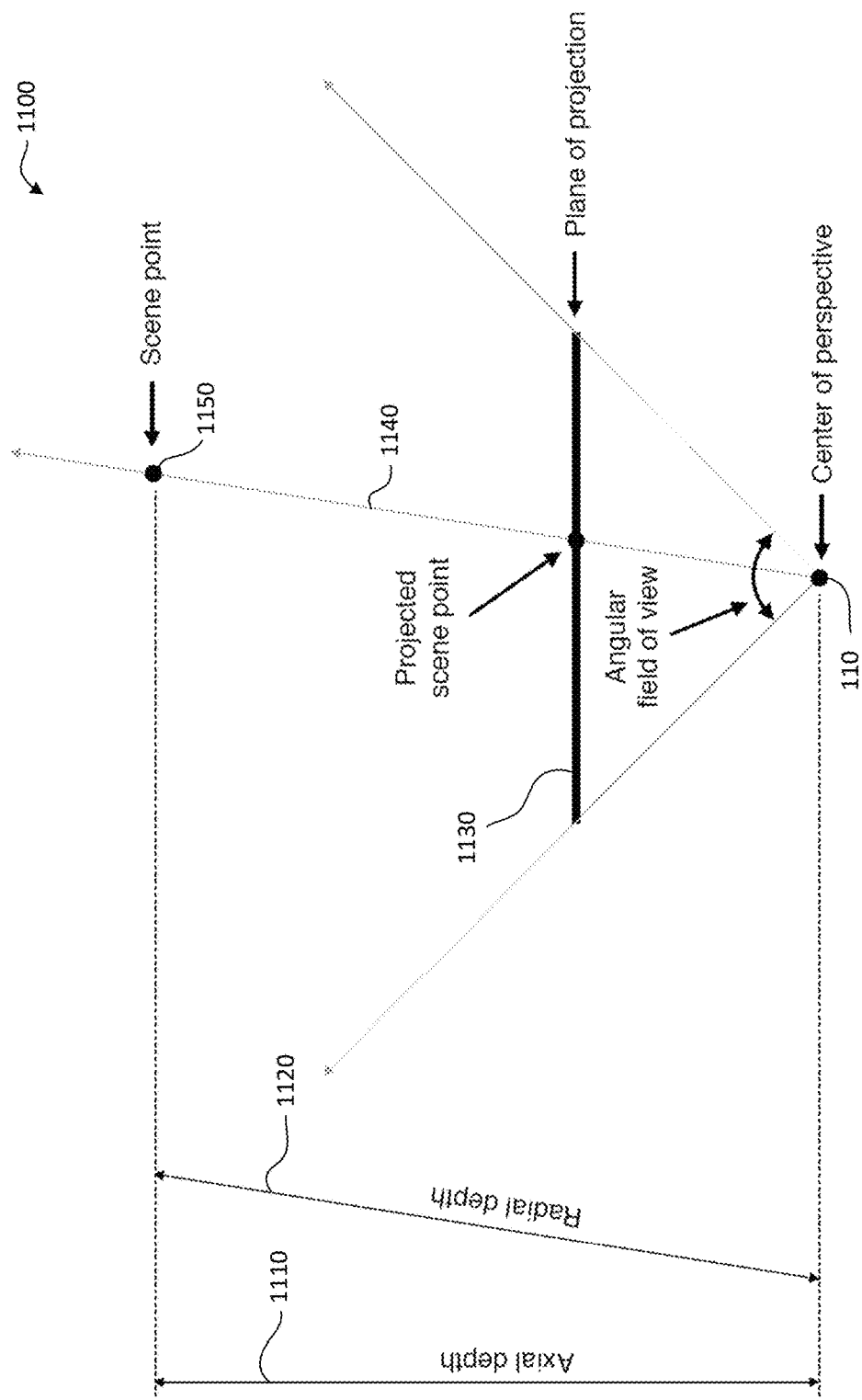
FIG. 11 is a diagram depicting axial depth and radial depth, according to one embodiment.

Referring to FIG. 11, a diagram 1100 depicts axial depth 1110 and radial depth 1120, according to one embodiment. As shown, the axial depth 1110 may be perpendicular to the plane of projection 1130. Conversely, the radial depth 1120 may be parallel to the ray 1140 passing from the center of perspective 110 to the point 1150 to be reprojected.

The depth values in RGBD vantages may be computed in a different manner, relative to a shared center of depth, rather than to the center of perspective of that vantage. The shared point may be at the center of a distribution of vantages, for example. And although both radial and axial depth values may be measured relative to a point other than the center of perspective, measuring depth radially from a shared center of depth has multiple properties that may be advantageous for vantages, including but not limited to the following:

1. Radial depth values for a given scene point may match in all vantages that include a projection of that scene point, regardless of the positions of the vantages.
2. If the represented precision of depth values is itself a function of the absolute depth value (as when, for example, depths are stored as reciprocals rather than as metric values), then the depth values for a given scene point may have the same precision in each vantage because they have the same value.
3. If the representation of depth values has a range (as it does when, for example, reciprocals of metric depth values are normalized to a range of zero through one) then all vantages may share the same metric range.

Figure 12:
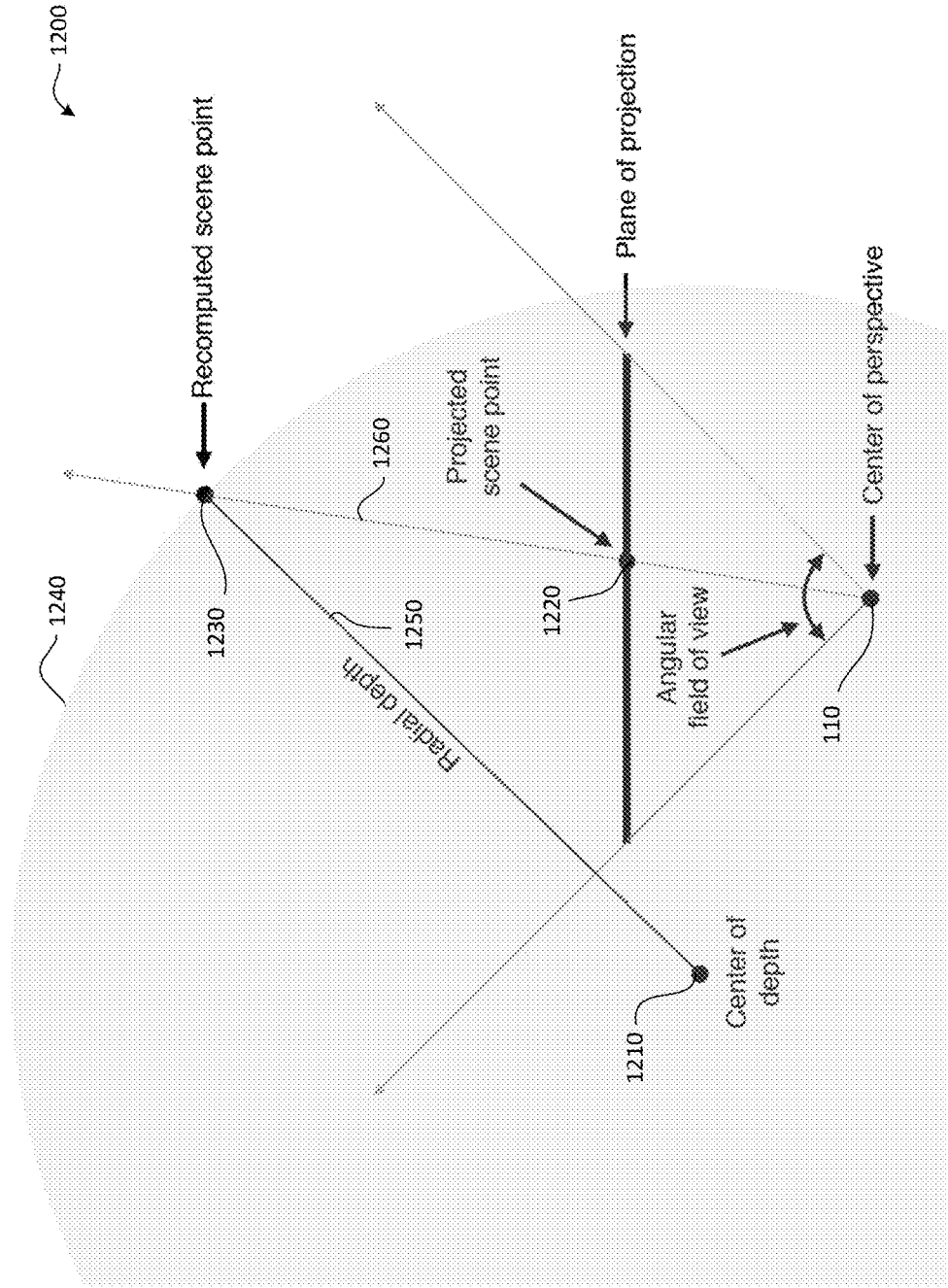
FIG. 12 is a diagram depicting nonplanar reprojection, according to one embodiment.

Referring to FIG. 12, a diagram 1200 depicts planar reprojection, wherein, rather than measuring radial depths in the reprojected image from the center of perspective, the radial depths in the reprojected image are measured from a center point called the center of depth, according to one embodiment. During projection, depths in RGBD pixels may be computed relative to a center of depth 1210 by simply computing the distance from the scene point 1220 to the center of depth 1210. During reprojection, the inverse calculation may be made to compute the (reprojected or recomputed) scene point 1230 from an RGBD pixel, for example, at the scene point 1220. This calculation may involve solving a system of two equations. One equation may specify that the recomputed scene point 1230 lies on a sphere 1240 centered at the center of depth 1210, with radius 1250 equal to the pixel's depth. The other equation may specify that the point lies on the ray 1260 that extends from the center of perspective 110 through the center of the pixel at the scene point 1220. Such ray-sphere intersections are used extensively in three-dimensional computer graphics, especially during rendering via a variety of algorithms known as ray tracing algorithms. Many such algorithms are known in the art. Some examples are provided in, for example, Mapping Between Sphere, Disk, and Square, Martin Lambers, Journal of Computer Graphics Techniques, Volume 5, Number 2, 2016.

Vantage Generation

Figure 13:
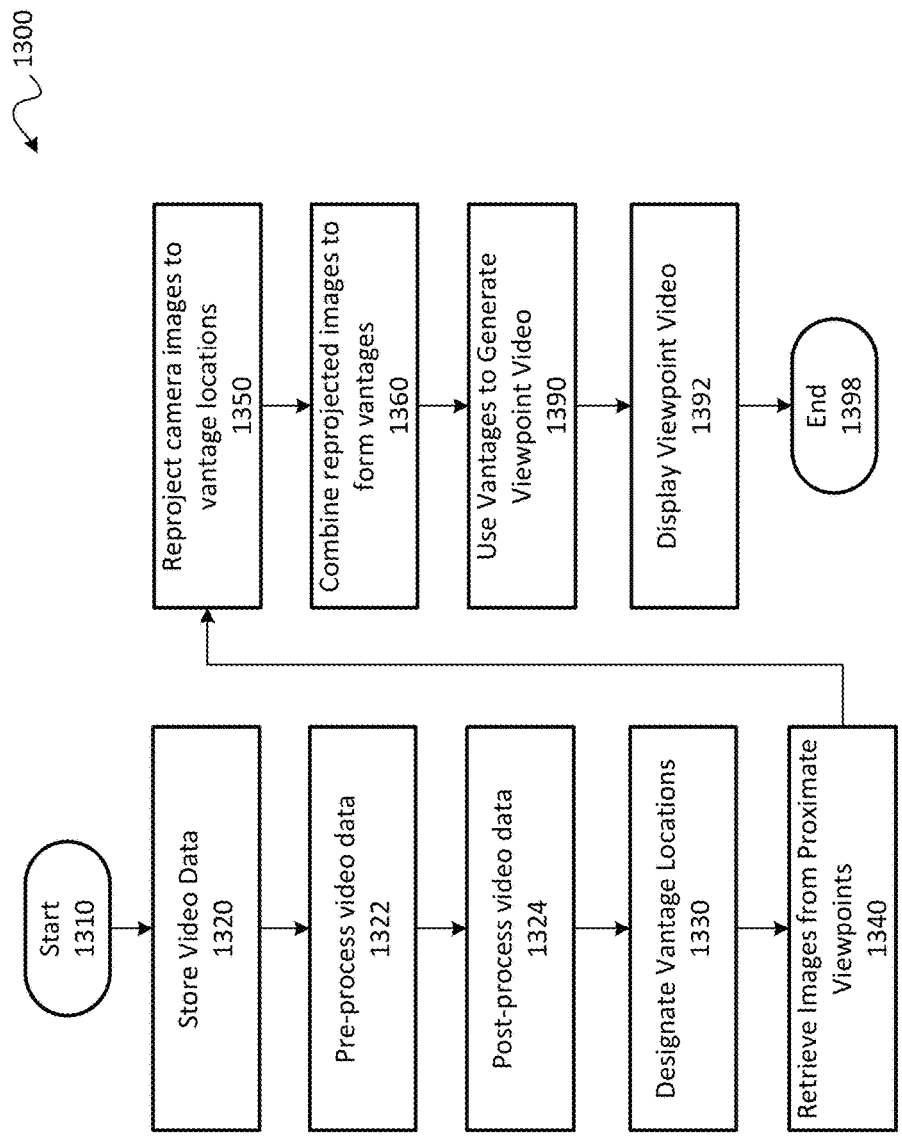
FIG. 13 is a flow diagram depicting a method for delivering video for a virtual reality or augmented reality experience, according to one embodiment.

Referring to FIG. 13, a flow diagram depicts a method 1300 for preparing video data of an environment for a virtual reality or augmented reality experience, according to one embodiment. As shown, the method 1300 may start 1310 with a step 1320 in which video data is stored. The video data may encompass video from multiple viewpoints and/or viewing directions within a viewing volume that can be selectively delivered to the viewer based on the position and/or orientation of the viewer's head within the viewing volume, thus providing an immersive experience for the viewer. The video data may be volumetric video, which may be captured through the use of light-field cameras as described previously, or through the use of conventional cameras.

In a step 1322, the video data may be pre-processed. Pre-processing may entail application of one or more steps known in the art for processing video data, or more particularly, light-field video data. In some embodiments, the step 1322 may include adding depth to the video stream through the use of depth data captured contemporaneously with the video data (for example, through the use of LiDAR or other depth measurement systems) and/or via application of various computational steps to extract depth information from the video stream itself.

In a step 1324, the video data may be post-processed. Post-processing may entail application of one or more steps known in the art for processing video data, or more particularly, light-field video data. In some embodiments, the step 1324 may include color balancing, artifact removal, blurring, sharpening, and/or any other process known in the processing of conventional and/or light-field video data.

In a step 1330, a plurality of locations may be designated within a viewing volume. The locations may be distributed throughout the viewing volume such that one or more vantages are close to each possible position of the viewer's head within the viewing volume. Thus, the vantages may be used to generate viewpoint video with accuracy. Notably, the viewing volume may move or change in shape over time, relative to the environment. Thus, the locations of vantages may be designated for each of multiple time frames within the duration of the experience.

The locations may be designated automatically through the use of various computer algorithms, designated manually by one or more individuals, or designated through a combination of automated and manual methods. In some examples, the locations may be automatically positioned, for example, in an even density within the viewing volume. Then, one or more individuals, such as directors or editors, may modify the locations of the vantages in order to decide which content should be presented with greater quality and/or speed. Use of importance metrics to set vantage locations is set forth in related U.S. application Ser. No. 15/590,808 for "Adaptive Control for Immersive Experience Delivery,", filed on May 9, 2017, the disclosure of which is incorporated herein by reference in its entirety.

In a step 1340, for each of the locations, images may be retrieved from the video data, from capture locations representing viewpoints proximate the location. The images may, in some embodiments, be images directly captured by a camera or sensor of a camera array positioned proximate the location. Additionally or alternatively, the images may be derived from directly captured images through the use of various extrapolation and/or combination techniques.

The images retrieved in the step 1340 may optionally include not only color data, such as RGB values, for each pixel, but also depth data. Thus, the images may, for example, be in RGBD format, with values for red, green, blue, and depth for each pixel. The depth values for the pixels may be measured during capture of the image through the use of depth measurement sensors, such as LiDAR modules and the like, or the depth values may be computed by comparing images captured by cameras or sensors at different locations, according to various methods known in the art.

In some embodiments, the output from the cameras used to capture the video data may be stored in two files per camera image: 00000_rgba.exr and 00000_adist.exr. The RGBA file is a 4-channel half-float EXR image, with linear SRGB-space color encoding and alpha indicating confidence in the validity of the pixel. Zero may represent no confidence, while one may represent high confidence. Alpha may be converted to a binary validity: true (valid) if alpha is greater than one half, false (invalid) otherwise. The axial distance file is a 1-channel half-float EXR image, with pixels that are axial distances (parallel to the line of sight) from (the plane of) the center of perspective to the nearest surface in the scene. These distances may have to be positive to represent valid distances; zero may be used to indicate an invalid pixel. Further, these distances may all be within a range with a ratio of far-to-near that is less than 100. The ratio of far-to-near of the range may beneficially be closer to ten.

In some embodiments, the following two files per camera image may exist: 00000.rgb.jpeg and 00000.z.bus. The RGB file may be a standard JPEG compression, using SRGB nonlinear encoding or the like. In other examples, other encoding methods similar to JPEG non-linear encoding may be used. The Z file contains radial z values in normalized window coordinates, represented as 16-bit unsigned integers. The term "normalized window coordinates" is used loosely because the depth values may be transformed using the NWC transform, but may be radial, not axial, and thus may not be true NWC coordinates. Alternatively, it is further possible to cause these radial distances to be measured from a point other than the center of perspective, for example, from the center of the camera or camera array used to capture the images. These output files may be further processed by compressing them using a GPU-supported vector quantization algorithm or the like.

In some embodiments, two JSON files are provided in addition to the image files captured by the camera or camera array. The first, captured_scene.json, describes the capture rig (camera locations, orientations, and fields of view) and the input and desired output file formats. The second, captured_resample.json, describes which and how many vantages are to be made, including details on the reprojection algorithm, the merge algorithm, and the projection type of the vantages. The projection type of the vantages may be, for example, cylindrical or equirectangular. This data may be referenced in steps of the method 1300, such as the step 1350 and the step 1360.

In a step 1350, the images (or, in the case of video, video streams) retrieved in the step 1340 may be reprojected to each corresponding vantage location. If desired, video data from many viewpoints may be used for each vantage, since this process need not be carried out in real-time, but may advantageously be performed prior to initiation of the virtual reality or augmented reality experience.

In a step 1360, the images reprojected in the step 1350 may be combined to generate a combined image. The reprojected images may be combined in various ways. According to some embodiments, the reprojected images may be combined by computing a fitness value for each pixel of the images to be combined. Linear interpolation may be used. The fitness value may be an indication of confidence in the accuracy of that pixel, and/or the desirability of making that pixel viewable by the viewer. A simple serial algorithm or the like may be used to select, for each pixel of the combined image for a location, the reprojected image pixel at the corresponding position that has the best fitness value. This may be the algorithm included in the captured_resample.json file referenced previously. There is no limit to the number of camera images that can be combined into a single combined image for a vantage. Neighboring vantage pixels may come from different cameras, so there is no guarantee of spatial coherence.

In a step 1390, the vantages may be used to generate viewpoint video for a user. This step can include reprojection and subsequent combination of vantage images. The viewpoint video may be generated in real-time based on the position and/or orientation of the viewer's head. The viewpoint video may thus present a user-movable view of the scene in the course of a virtual reality or augmented reality experience. The viewpoint video may, for any given frame, be generated by reprojecting multiple vantages to the viewer's viewpoint. A relatively small number of vantages may be used to enable this process to be carried out in real-time, so that the viewpoint video is delivered to the HMD with an imperceptible or nearly imperceptible delay. In some embodiments, only four vantages may be combined to reproject the viewpoint video.

Lerping and/or fitness values may again be used to facilitate and/or enhance the combination, as in the step 1360. If desired, the fitness values used in the step 1390 may be the same as those connected to the pixels that were retained for use in each vantage in the step 1360. Additionally or alternatively, new fitness values may be used, for example, based on the perceived relevance of each vantage to the viewpoint for which viewpoint video is to be generated.

Reprojection of vantages to generate viewpoint video may additionally or alternatively be carried out as set forth in related U.S. application Ser. No. 15/590,877 for "Spatial Random Access Enabled Video System with a Three-Dimensional Viewing Volume,", filed on May 9, 2017, the disclosure of which is incorporated herein by reference in its entirety.

In a step 1392, the viewpoint video may be displayed for the user. This may be done, for example, by displaying the video on a head-mounted display (HMD) worn by the user, and/or on a different display. The method 1300 may then end 1398.

The steps of the method 1300 may be reordered, omitted, replaced with alternative steps, and/or supplemented with additional steps not specifically described herein. The steps set forth above will be described in greater detail subsequently.

Virtual Reality Display

Figure 14:
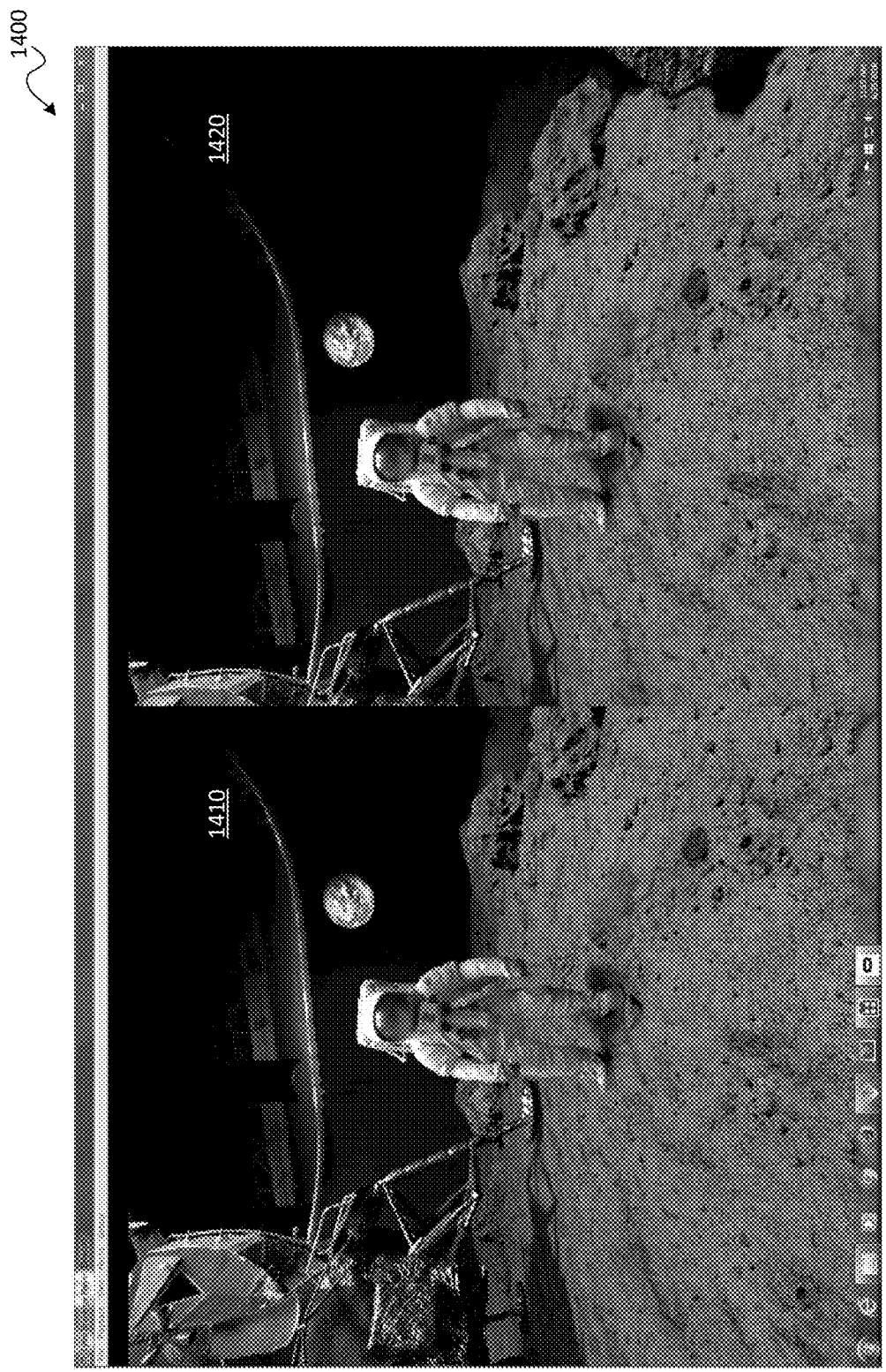
FIG. 14 is a screenshot diagram depicting a frame from a viewpoint video of a virtual reality experience, according to one embodiment.

Referring to FIG. 14, a screenshot diagram 1400 depicts a frame from a viewpoint video of a virtual reality experience, according to one embodiment. As shown, the screenshot diagram 1400 depicts a left headset view 1410, which may be displayed for the viewer's left eye, and a right headset view 1420, which may be displayed for the viewer's right eye. The differences between the left headset view 1410 and the right headset view 1420 may provide a sense of depth, enhancing the viewer's perception of immersion in the scene. FIG. 14 may depict a frame, for each eye, of the viewpoint video generated in the step 1390.

Vantage Distribution

As indicated previously, the video data for a virtual reality or augmented reality experience may be divided into a plurality of vantages, each of which represents the view from one location in the viewing volume. More specifically, a vantage is a portion of video data, such as an RGBD image, that exists as part of multiple portions of video data at centers of perspective distributed through a viewing volume. A vantage can have any desired field-of-view (e.g. 90° horizontal×90° vertical, or 360° horizontal×180° vertical) and pixel resolution. A viewing volume may be populated with vantages in three-dimensional space at some density.

Based on the position of the viewer's head, which may be determined by measuring the position of the headset worn by the viewer, the system may interpolate from a set of vantages to render the viewpoint video in the form of the final left and right eye view, such as the left headset view 1410 and the right headset view 1420 of FIG. 14. A vantage may contain extra data such as depth maps, edge information, and/or the like to assist in interpolation of the vantage data to generate the viewpoint video.

The vantage density may be uniform throughout the viewing volume, or may be non-uniform. A non-uniform vantage density may enable the density of vantages in any region of the viewing volume to be determined based on the likelihood the associated content will be viewed, the quality of the associated content, and/or the like. Thus, if desired, importance metrics may be used to establish vantage density for any given region of a viewing volume.

Figure 15:
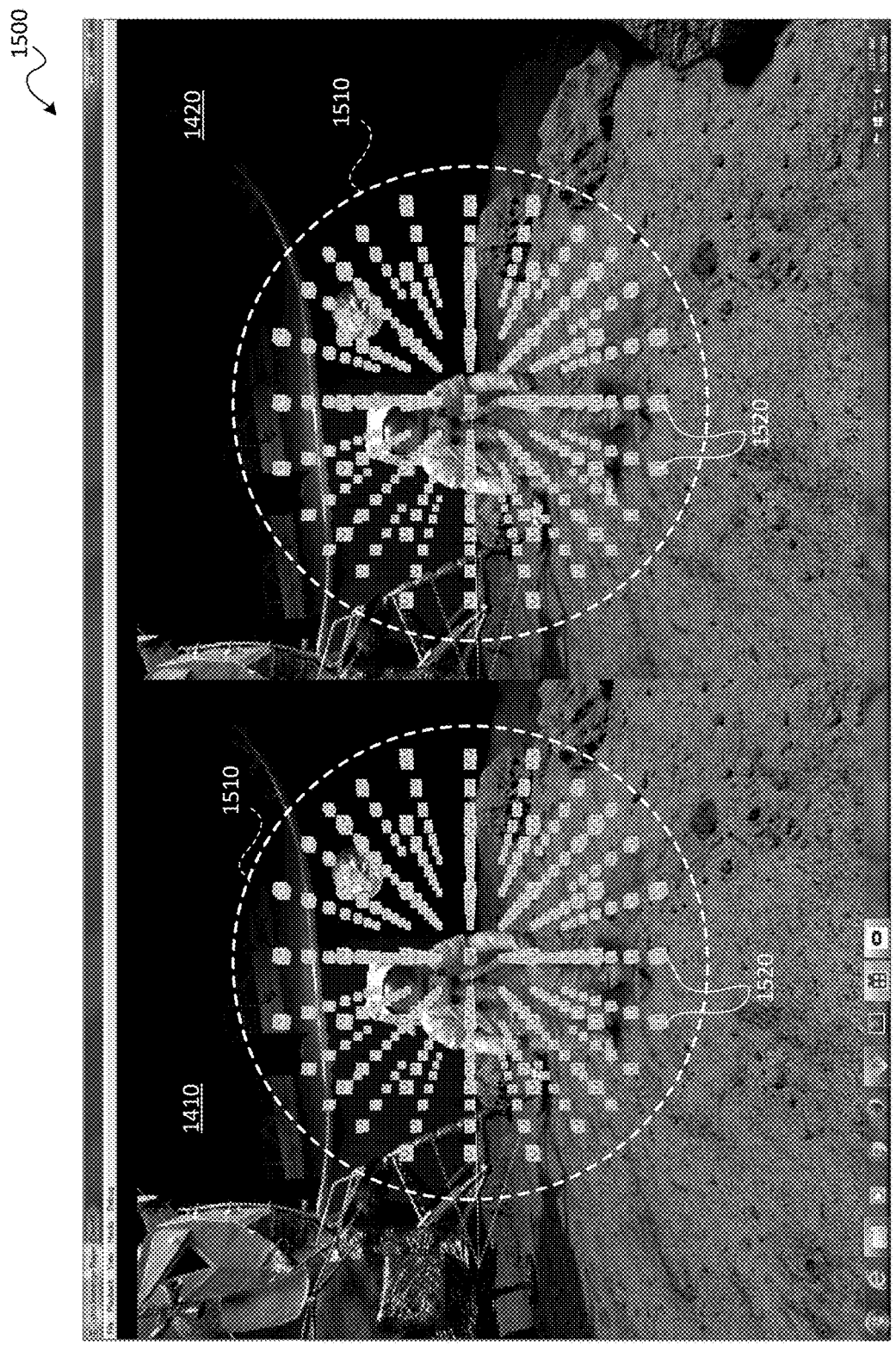
FIG. 15 is a screenshot diagram depicting the screenshot diagram of FIG. 14, overlaid with a viewing volume for each of the eyes, according to one embodiment.

Referring to FIG. 15, a screenshot diagram 1500 depicts the screenshot diagram 1400 of FIG. 14, overlaid with a viewing volume 1510 for each of the eyes, according to one embodiment. Each viewing volume 1510 may contain a plurality of vantages 1520, each of which defines a point in three-dimensional space from which the scene may be viewed by the viewer. Viewing from between the vantages 1520 may also be carried out by combining and/or extrapolating data from vantages 1520 adjacent to the viewpoint.

The vantages 1520 may be positioned at the locations designated in the step 1330. In at least one embodiment, vantage 1520 positioning can be decoupled from those positions where cameras are situated.

Figure 16:
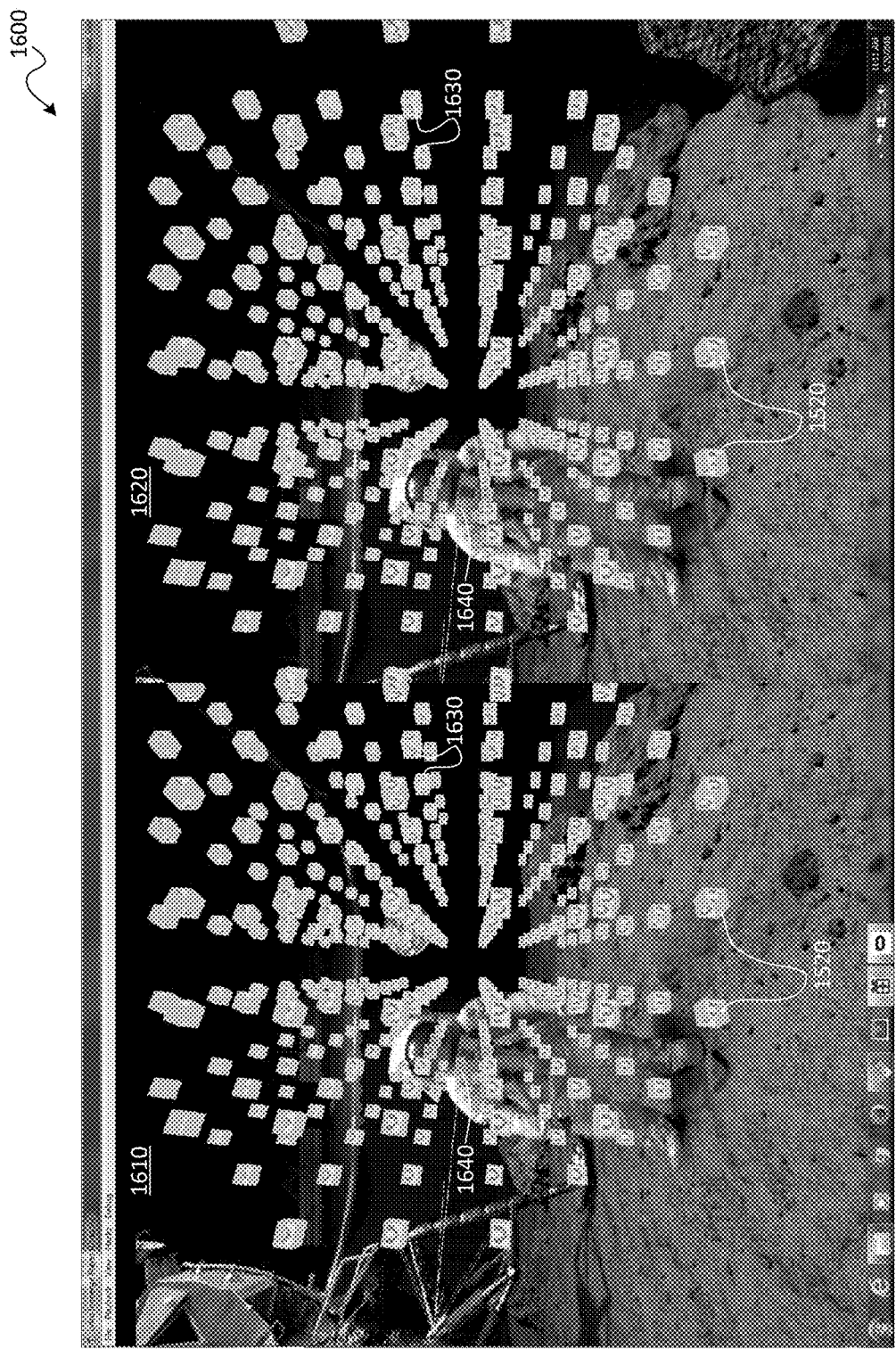
FIG. 16 is a screenshot diagram depicting the view after the headset has been moved forward, toward the scene of FIG. 14, according to one embodiment.

Referring to FIG. 16, a screenshot diagram 1600 depicts the view after the headset has been moved forward, toward the scene of FIG. 14, according to one embodiment. Again, a left headset view 1610 and a right headset view 1620 are shown, with the vantages 1520 of FIG. 15 superimposed. Further, for each eye, currently and previously traversed vantages 1630 are highlighted, as well as the current viewing direction 1640.

Input with Limited Degrees of Freedom

Figure 17:
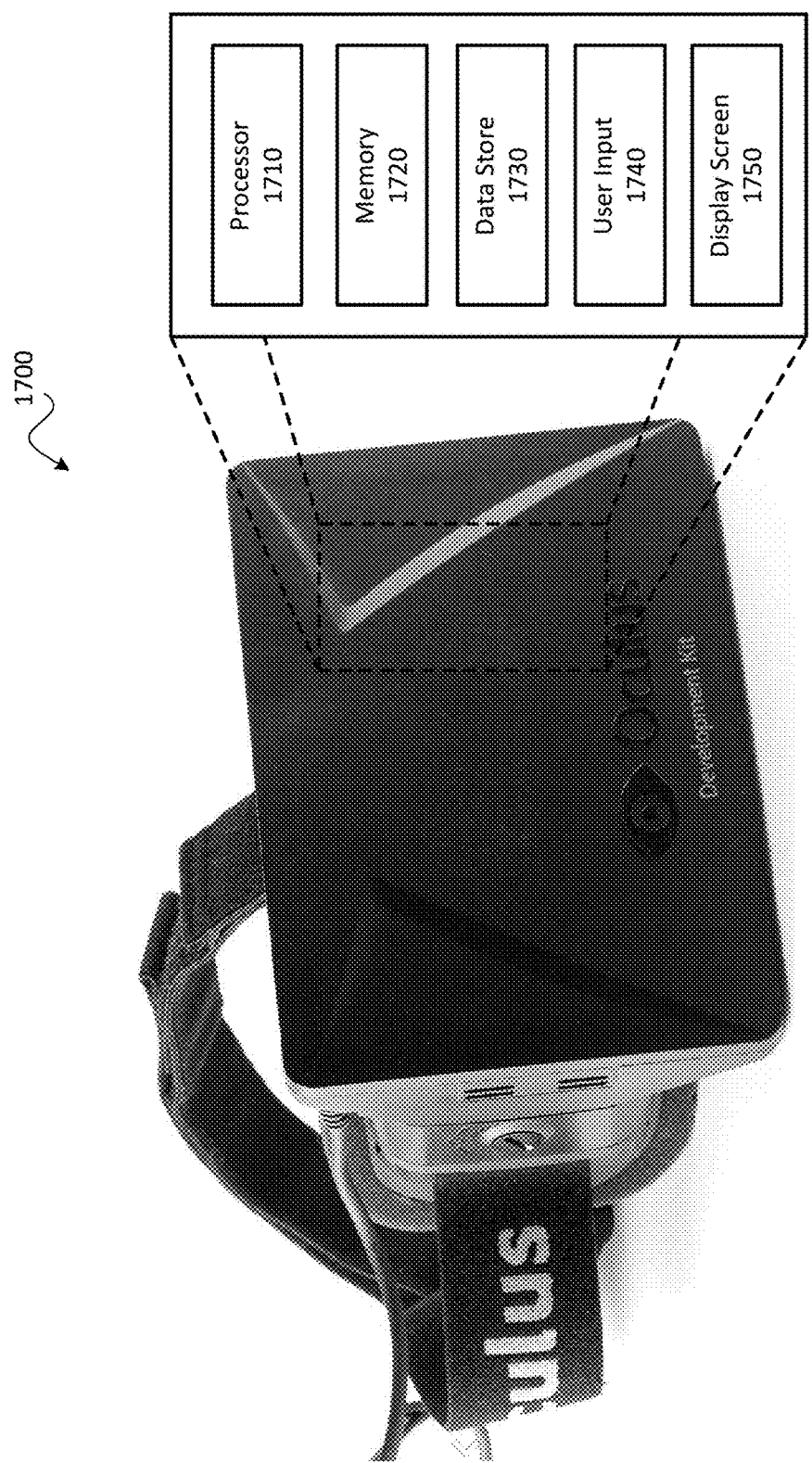
FIG. 17 depicts some exemplary components of a virtual reality headset, according to one embodiment.

Virtual reality or augmented reality may be presented in connection with various hardware elements. By way of example, FIG. 17 shows an image of the Oculus Rift Development Kit headset as an example of a virtual reality headset 1700. Viewers using virtual reality and/or augmented reality headsets may move their heads to point in any direction, move forward and backward, and/or move their heads side to side. The point of view from which the user views his or her surroundings may change to match the motion of his or her head.

FIG. 17 depicts some exemplary components of a virtual reality headset 1700, according to one embodiment. Specifically, the virtual reality headset 1700 may have a processor 1710, memory 1720, a data store 1730, user input 1740, and a display screen 1750. Each of these components may be any device known in the computing and virtual reality arts for processing data, storing data for short-term or long-term use, receiving user input, and displaying a view, respectively. The user input 1740 may include one or more sensors that detect the position and/or orientation of the virtual reality headset 1700. By maneuvering his or her head, a user (i.e., a "viewer") may select the viewpoint and/or view direction from which he or she is to view an environment.

The virtual reality headset 1700 may also have additional components not shown in FIG. 17. Further, the virtual reality headset 1700 may be designed for standalone operation or operation in conjunction with a server that supplies video data, audio data, and/or other data to the virtual reality headset. Thus, the virtual reality headset 1700 may operate as a client computing device. As another alternative, any of the components shown in FIG. 17 may be distributed between the virtual reality headset 1700 and a nearby computing device such that the virtual reality headset 1700 and the nearby computing device, in combination, define a client computing device. Yet further, some hardware elements used in the provision of a virtual reality or augmented reality experience may be located in other computing devices, such as remote data stores that deliver data from a video stream to the virtual reality headset 1700.

In some embodiments, a virtual reality or augmented reality experience may be presented on a device that provides data regarding the viewer with only three degrees of freedom (3DOF). For example, in some embodiments, the virtual reality headset 1700 may have user input 1740 that only receives orientation data, and not position data, for the viewer's head. In particular, where the virtual reality headset incorporates a smartphone or other multi-function device, such a device may have gyroscopes and/or other sensors that can detect rotation of the device about three axes, but may lack any sensors that can detect the position of the device within a viewing environment. As a result, the virtual reality experience presented to the viewer may seem unresponsive to motion of his or her head.

In some embodiments, the orientation data provided by such a device may be used to estimate position, with accuracy sufficient to simulate an experience with six degrees of freedom (translation and rotation about and/or along all three orthogonal axes). This may be done, in some embodiments, by mapping the orientation data to position data. More details will be provided in connection with FIG. 18, as follows.

Exemplary Method

Figure 18:
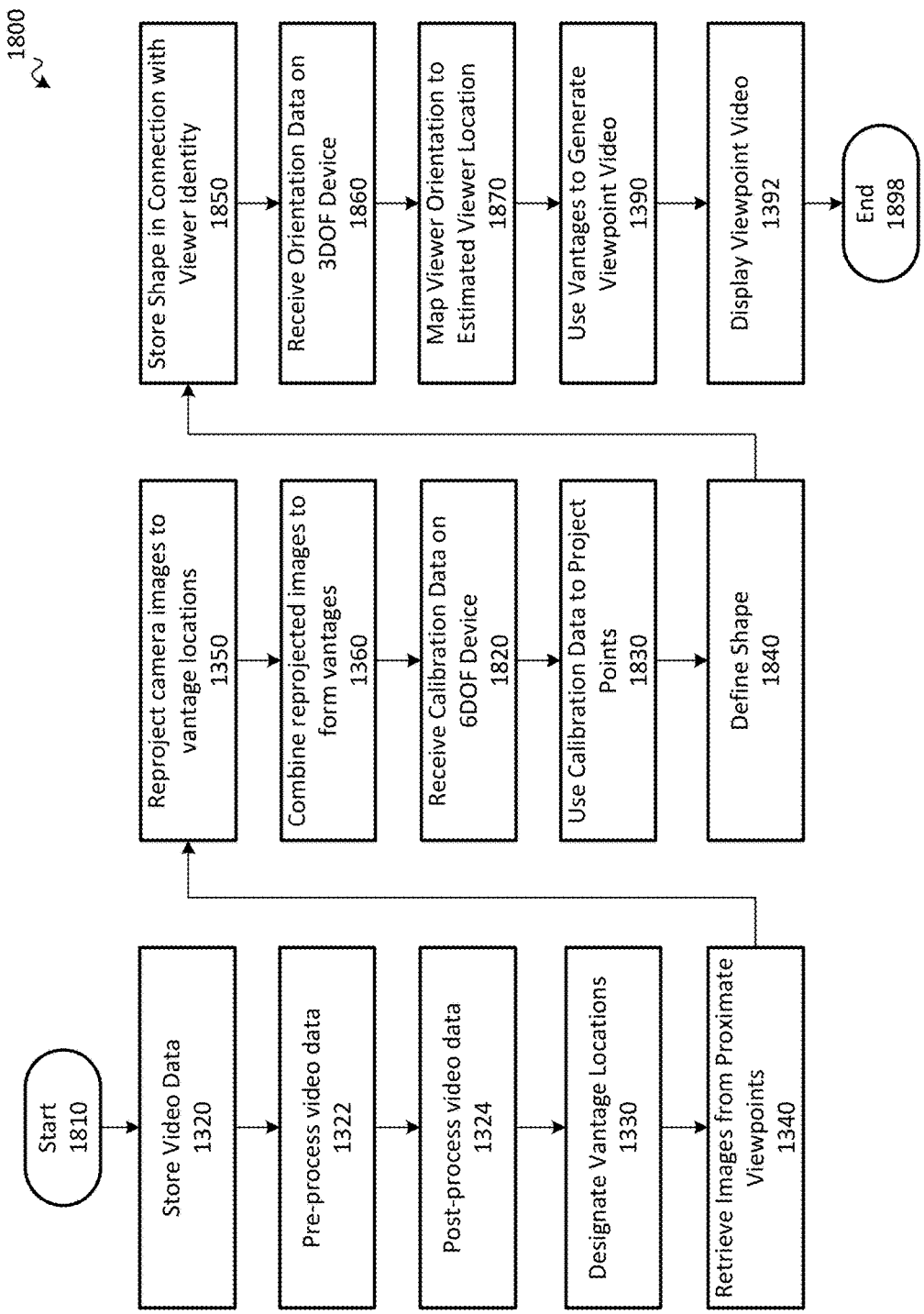
FIG. 18 is a flow diagram depicting a method for providing a virtual reality and/or augmented reality experience, according to one embodiment.

FIG. 18 is a flow diagram depicting a method 1800 for providing a virtual reality and/or augmented reality experience, according to one embodiment. The method 1800 may be performed, according to some examples, through the use of one or more virtual reality headsets, such as the virtual reality headset 1700 of FIG. 17. In some examples, calibration may be carried out with a virtual reality headset capable of providing viewer data with six degrees of freedom, inclusive of viewer orientation data and viewer position data. The actual virtual reality or augmented reality experience may then be provided with a virtual reality headset that provides viewer data with only three degrees of freedom.

The method 1800 may include steps similar to those of FIG. 13. For example, the method 1800 may include a step 1320, a step 1322, a step 1324, a step 1330, a step 1340, a step 1350, a step 1360, a step 1390, and/or a step 1392. Alternatively, one or more of these steps may be omitted, altered, or supplemented with additional steps to adapt the method 1800 for use with hardware that provides limited degrees of freedom.

In some embodiments, the methods presented herein may be used in connection with computer-generated virtual reality or augmented reality experiences. Such experiences may not necessarily involve retrieval of a video stream, since the client computing device may generate video on the fly based on a scene that has been modeled in three-dimensions within the computer. Thus, the step 1320, the step 1322, the step 1324, the step 1330, the step 1340, the step 1350, and the step 1360 may be omitted in favor of steps related to generation and storage of the three-dimensional environment. Similarly, in such embodiments, the step 1390 would use the three-dimensional environment, rather than the vantages, to generate viewpoint video. However, for illustrative purposes, the following description assumes that the virtual reality or augmented reality experience includes at least some element of captured video that is to be presented to the viewer.

As shown in FIG. 18, the method 1800 may start 1810 with a step 1320 in which video data is stored. The video data may be volumetric video, which may be captured through the use of light-field cameras as described previously, or through the use of conventional cameras.

In a step 1322, the video data may be pre-processed. Pre-processing may entail application of one or more steps known in the art for processing video data, or more particularly, light-field video data, such as the addition of depth.

In a step 1324, the video data may be post-processed. Post-processing may entail application of one or more steps known in the art for processing video data, or more particularly, light-field video data.

In a step 1330, a plurality of locations may be designated within a viewing volume, for subsequent use as vantages. The locations may be distributed throughout the viewing volume such that one or more vantages are close to each possible position of the viewer's head within the viewing volume.

In a step 1340, for each of the locations, images may be retrieved from the video data, from capture locations representing viewpoints proximate the location. The images may, in some embodiments, be images directly captured by a camera or sensor of a camera array positioned proximate the location. Additionally or alternatively, the images may be derived from directly captured images through the use of various extrapolation and/or combination techniques. The images retrieved in the step 1340 may include not only color data, such as RGB values, for each pixel, but also depth data.

In a step 1350, the images (or, in the case of video, video streams) retrieved in the step 1340 may be reprojected to each corresponding vantage location. If desired, video data from many viewpoints may be used for each vantage, since this process need not be carried out in real-time, but may advantageously be performed prior to initiation of the virtual reality or augmented reality experience. In a step 1360, the images reprojected in the step 1350 may be combined to generate a combined image for each of the vantages.

In a step 1820, the viewer may use a calibration device, to provide calibration data. The calibration device may be a virtual reality headset like the virtual reality headset 1700 of FIG. 17, with a user input 1740 capable of receiving viewer data with six degrees of freedom (for example, translation and rotation along and about all three orthogonal axes). The step 1820 may be carried out prior to commencement of the virtual reality or augmented reality experience.

The step 1820 may be designed to determine the manner in which a specific viewer translates his or head (i.e., moves the head forward, backward, left, right, upward, or downward) in order to look in each of various directions. In this disclosure, reference to a viewer's head refers, more specifically, to the point midway between the viewer's eyes. This point will move in three dimensions as the viewer rotates his or her neck to look in different directions. The step 1820 may include having the viewer move his or her head to look in a variety of directions with the virtual reality headset on and gathering both orientation data and position data. The position and orientation of the viewer's head may be logged in each of the orientations.

In a step 1830, the calibration data collected in the step 1820 may be used to project points onto a shape. For example, a point cloud may be plotted, with one point for the location of the viewer's head in each of the calibration orientations. The points may simply be placed in a three-dimensional grid, according to the actual location of the viewer's head, in three-dimensional space.

In a step 1840, a shape may be defined based on the points projected in the step 1830. In some embodiments, the shape may be fitted to the point cloud. A wide variety of shapes may be used. In some embodiments, a spherical shape may be fitted to the point cloud. In alternative embodiments, a different shape may be used, such as a three-dimensional spline shape or the like. Use of a sphere may be advantageous in that a sphere fits well with the kinematics of most viewers' heads, and is computationally simple, since only two parameters (center location and radius) need be identified. However, in some embodiments, more complex shapes with more than two parameters may be used.

In a step 1850, the shape (or parameters representative of the shape) may be stored in connection with the viewer's identity. Thus, when it is time to provide the virtual reality or augmented reality experience, the viewer's identity may be entered (for example, based on viewer selection) to enable use of the shape pertaining to him or her for mapping viewer orientation to estimated viewer location.

The step 1820, the step 1830, the step 1840, and the step 1850 are optional. In some embodiments, no viewer-specific calibration data may be collected. Rather, calibration may be performed with respect to a single viewer, and the corresponding shape may simply be used for all viewers. If desired, the parameters may be adjusted based on various anatomical features of the viewer (such as height) in an attempt to customize the shape to a new viewer without viewer-specific calibration. However, due to variations in anatomy, posture, and kinematics, it may be possible to more accurately map viewer orientation to estimated viewer location through the use of calibration data specific to the individual viewer, as obtained in the step 1820, the step 1830, the step 1840, and the step 1850.

In some embodiments, a shape does not need to be generated or referenced. Rather, calibration data may be maintained for each viewer, or for an exemplary viewer, with a lookup table or the like. Such a lookup table may have a listing of viewer orientations, with a matching viewer head position for each viewer orientation. For a viewer orientation that is not on the lookup table, the system may find the closest viewer orientation(s) that are in the lookup table, and may use the corresponding viewer head position(s). Where multiple viewer head positions are used, they may be averaged together, if desired, to provide an estimated viewer head position that is closer to the likely position of the viewer's head, when oriented at the viewer orientation.

Once vantages have been generated, as in the step 1330, the step 1340, the step 1350, and the step 1360, and all desired calibration steps have been completed, as in the step 1820, the step 1830, the step 1840, and the step 1850, the virtual reality or augmented reality experience may commence. The experience may be provided with a virtual reality headset that is only capable of limited degrees of freedom. In some embodiments, this may be a virtual reality headset, such as the virtual reality headset 1700 of FIG. 17, in which the user input 1740 only receives orientation data indicative of the orientation of the viewer's head, and does not receive position data indicative of a position of the viewer's head.

In a step 1860, orientation data may be received from the viewer, for example, via the user input 1740 of the virtual reality headset 1700. This may entail receiving viewer orientation data, with three degrees of freedom (i.e., with the three-dimensional orientation of the viewer specified in any suitable coordinate system). Data regarding the actual position of the viewer's head may not be received. The step 1860 may be carried out in the course of providing the virtual reality or augmented reality experience (i.e., as the viewer is beginning to interact with the virtual or augmented environment).

In a step 1870, the viewer orientation received in the step 1860 may be mapped to an estimated viewer location. This may be done in various ways. As mentioned previously, a shape may be used for the mapping. However, as also set forth previously, a lookup table or other tool may be used.

Where a shape is used, in some embodiments, the viewer orientation may be used to define a ray having a predetermined point of origin relative to the shape. The intersection of the ray with the shape may be located. Then, based on the location of the intersection of the ray with the shape, the estimated viewer location may be generated. In some embodiments, where the shape is defined in a coordinate system that matches that of the viewer, the location of the intersection may be the same as the estimated viewer location.

Where a lookup table or other data structure is used in place of the shape, such a data structure may operate to provide the estimated viewer location based on the viewer orientation. A lookup table, by way of example, may function as set forth above.

Once the estimated viewer location has been obtained, it may be used in place of an actual viewer location (for example, as measured by a virtual reality headset that provides input with six degrees of freedom). Thus, the viewer orientation may be mapped to an estimated viewer location to provide an experience with six degrees of freedom, even though the available input has only three degrees of freedom.

Thus, in a step 1390, the vantages may be used to generate viewpoint video for a user. The viewpoint video may be generated in real-time based on the position and/or orientation of the viewer's head, as described in connection with the method 1300 of FIG. 13.

In a step 1392, the viewpoint video may be displayed for the user. This may be done, for example, by displaying the video on a head-mounted display (HMD) worn by the user, such as on the virtual reality headset 1700. The method 1800 may then end 1898.

Exemplary Calibration

As described above, various calibration steps may be carried out in order to provide a relatively accurate mapping between viewer orientation and viewer position. These calibration steps may include, for example, the step 1820, the step 1830, the step 1840, and the step 1850. Exemplary results of performance of the step 1830 will be shown and described in connection with FIGS. 19A through 19C, as follows.

FIGS. 19A, 19B, and 19C are a plan view 1900, a front elevation view 1950, and a side elevation view 1960, respectively, of points 1910 plotted from calibration data received from a viewer, according to one embodiment. The points 1910 may be received in the course of performing the step 1820, and may be projected in the step 1830 to define a point cloud, as shown from different viewpoints in FIGS. 19A through 19C.

More particularly, each of the points 1910 may represent the location of the viewer's head as the viewer positions his or her head at various orientations. Since the virtual reality headset worn by the viewer during calibration may be designed to provide data with six degrees of freedom, the calibration data may include accurate viewer orientation and viewer position data. As shown, the viewer may be instructed to move his or her head to look to the right, to and left, downward, and upward. The resulting locations of the viewer's head are plotted in FIGS. 19A through 19C as the points 1910.

As shown in FIGS. 19A through 19C, the points 1910 are in a generally spherical arrangement. Thus, using a sphere to approximate the arrangement of the points 1910 may be a relatively natural choice. However, greater accuracy may be obtained by fitting more complex shapes to the arrangement of the points 1910.

Figures 20A, 20B, 20C:
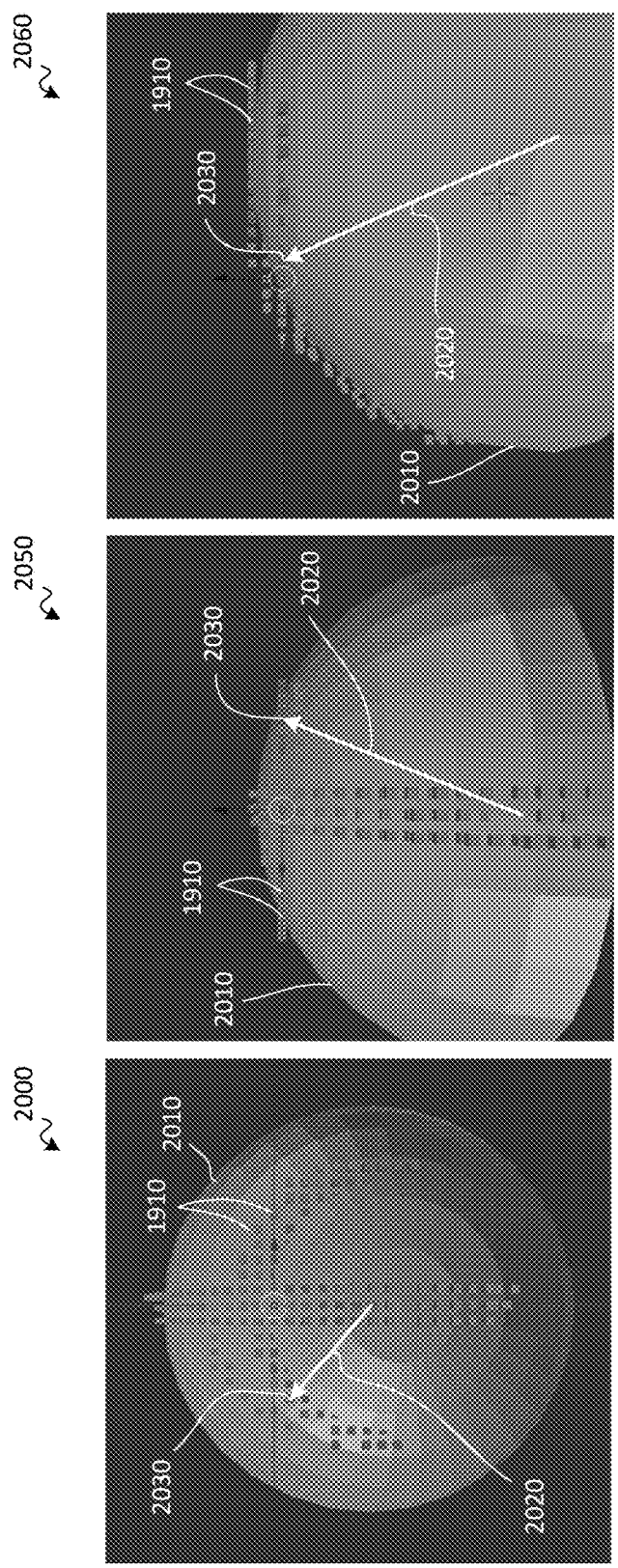
FIGS. 20A, 20B, and 20C are a plan view, a front elevation view, and a side elevation view, respectively, of the points of FIGS. 19A, 19B, and 19C, with a sphere fitted to their arrangement, according to one embodiment.

FIGS. 20A, 20B, and 20C are a plan view 2000, a front elevation view 2050, and a side elevation view 2060, respectively, of the points 1910 of FIGS. 19A, 19B, and 19C, with a sphere 2010 fitted to their arrangement, according to one embodiment. Thus, FIGS. 20A through 20C may illustrate the results of performance of the step 1840.

The sphere 2010 may be automatically fitted to the points 1910 through the use of any known mathematical algorithms for fitting a shape to a point cloud. Alternatively, a user may manually fit the sphere 2010 to the points 1910. The sphere 2010 may be positioned such that the points 1910, collectively, are as close as possible to the surface of the sphere

2010. Notably, fitting the sphere 2010 to the points 1910 does not require that the points 1910 lie precisely on the surface of the sphere 2010. Rather, some of the points 1910 may be displaced outwardly from the surface of the sphere 2010, while others may be embedded in the sphere 2010.

As mentioned previously, a different shape may be used for each viewer. Thus, for example, a viewer with a shorter neck and/or a smaller head may have points 1910 that define a smaller sphere 2010 than a viewer with a longer neck and/or a larger head. Although a one-size-fits-all approach may be used, the mapping of viewer orientations to estimated viewer positions may be more accurate if a viewer-specific shape is used.

Exemplary Mapping

Once the shape (for example, the sphere 2010 of FIGS. 20A through 20C) has been obtained and stored, it may be used to provide a mapping between each viewer orientation and the estimated viewer location that corresponds to it. This mapping may be carried out in various ways pursuant to the step 1870.

Referring again to FIGS. 20A through 20C, according to one embodiment, a ray 2020 may be generated. The ray 2020 may extend from a predetermined origin to the surface of the sphere 2010. In some embodiments, the predetermined origin may be the center of the sphere 2010. In alternative embodiments, the predetermined origin may be displaced from the center of the sphere.

The ray 2020 may extend along a direction that is determined based on the viewer orientation obtained by the virtual reality headset that provides limited degrees of freedom (for example, without measuring the viewer position). In some embodiments, the ray 2020 may extend along the viewer orientation. The ray 2020 may intersect the sphere 2010 at a point 2030 on the surface of the sphere 2010.

The location of the point 2030 may be used to determine the estimated viewer location (i.e., the estimated position of the point midway between the viewer's eyes). In some embodiments, the sphere 2010 may be scaled such that the location of the point 2030 in three-dimensional space is the estimated viewer location. Thus, the sphere 2010 may be used as a tool to easily map each viewer orientation to a corresponding estimated viewer location, so that a six-degree-of-freedom experience can effectively be delivered through a virtual reality headset that senses only three degrees of freedom.

In alternative embodiments, different shapes may be used. For example, in place of the sphere 2010, a three-dimensional spline shape may be used. Such a spline shape may have multiple radii, and may even have concave and convex elements, if desired. A mapping may be provided with such a shape by locating the intersection of a ray with the surface of the shape, in a manner similar to that described in connection with the sphere 2010.

In other alternative embodiments, a shape need not be used. A lookup table or other tool may be used, as described previously. In such cases, a ray need not be projected to carry out the mapping; rather, the mapping may be obtained through the use of the lookup table or other tool. Interpolation or other estimation methods may be used to obtain the estimated viewer location for any viewer orientation not precisely found in the lookup table or other tool.

The above description and referenced drawings set forth particular details with respect to possible embodiments. Those of skill in the art will appreciate that the techniques described herein may be practiced in other embodiments. First, the particular naming of the components, capitalization of terms, the attributes, data structures, or any other programming or structural aspect is not mandatory or significant, and the mechanisms that implement the techniques described herein may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some embodiments may include a system or a method for performing the above-described techniques, either singly or in any combination. Other embodiments may include a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions of described herein can be embodied in software, firmware and/or hardware, and when embodied in software, can be downloaded to reside on and be operated from different platforms used by a variety of operating systems.

Some embodiments relate to an apparatus for performing the operations described herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), and/or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the techniques set forth herein are not described with reference to any particular programming language. It will be appreciated that a variety of programming languages may be used to implement the techniques described herein, and any references above to specific languages are provided for illustrative purposes only.

Accordingly, in various embodiments, the techniques described herein can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the techniques described herein include: a mobile phone, personal digital assistant, smartphone, kiosk, server computer, enterprise computing device, desktop computer, laptop computer, tablet computer, consumer electronic device, television, set-top box, or the like. An electronic device for implementing the techniques described herein may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

In various embodiments, the techniques described herein can be implemented in a distributed processing environment, networked computing environment, or web-based computing environment. Elements can be implemented on client computing devices, servers, routers, and/or other network or non-network components. In some embodiments, the techniques described herein are implemented using a client/server architecture, wherein some components are implemented on one or more client computing devices and other components are implemented on one or more servers. In one embodiment, in the course of implementing the techniques of the present disclosure, client(s) request content from server(s), and server(s) return content in response to the requests. A browser may be installed at the client computing device for enabling such requests and responses, and for providing a user interface by which the user can initiate and control such interactions and view the presented content.

Any or all of the network components for implementing the described technology may, in some embodiments, be communicatively coupled with one another using any suitable electronic network, whether wired or wireless or any combination thereof, and using any suitable protocols for enabling such communication. One example of such a network is the Internet, although the techniques described herein can be implemented using other networks as well.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. A method for providing a virtual reality or augmented reality experience for a viewer, the method comprising:
   at a first input device, receiving orientation data indicative of a viewer orientation at which a head of a viewer is oriented;
   at a processor, mapping the viewer orientation to an estimated viewer location by:
   defining a ray at the viewer orientation;
   locating an intersection of the ray with a three-dimensional shape; and
   based on a three-dimensional location of the intersection, generating the estimated viewer location;
   at the processor, generating viewpoint video of a scene as viewed from a virtual viewpoint with a virtual location corresponding to the estimated viewer location, from along the viewer orientation; and
   at a display device, displaying the viewpoint video for the viewer.

2. The method of claim 1, wherein:
   the first input device is incorporated into a head-mounted display, and is incapable of providing an actual viewer location of the head; and
   receiving the orientation data comprises receiving a three-dimensional measurement of the viewer orientation.

3. The method of claim 1, wherein the three-dimensional shape is generally spherical.

4. The method of claim 1, further comprising, prior to receiving the orientation data:
   at a second input device, receiving calibration data for each of a plurality of calibration orientations of the head of the viewer, indicative of:
   a calibration viewer orientation at which the head is oriented; and
   a calibration viewer position at which the head is positioned;

for each of the calibration orientations, using the calibration viewer orientation and the calibration viewer position to project a point; and defining the three-dimensional shape based on locations of the points.

5. The method of claim 4, further comprising, prior to receiving the orientation data, storing the three-dimensional shape in connection with an identity of the viewer.

6. The method of claim 1, wherein:
the method further comprises, at a storage device, prior to generating the viewpoint video, retrieving at least part of a video stream captured by an image capture device; and
generating the viewpoint video comprises using at least part of the video stream.

7. The method of claim 6, wherein:
the method further comprises, prior to generating the viewpoint video:
at the processor, designating a plurality of locations, distributed throughout a viewing volume, at which a plurality of vantages are to be positioned to facilitate viewing of the scene from proximate the locations;
at the processor, for each location of the plurality of the locations:
retrieving a plurality of images of the scene captured from viewpoints proximate the location; and
combining the images to generate a combined image to generate a vantage; and
at a data store, storing each of the vantages;
retrieving at least part of the video stream comprises retrieving at least a subset of the vantages; and
generating the viewpoint video comprises using the subset to generate the viewpoint video.

8. The method of claim 7, wherein:
the method further comprises, prior to retrieving the subset of the vantages, identifying the subset of the vantages based on proximity of the vantages of the subset to the virtual viewpoint; and
using the vantages to generate the viewpoint video comprises reprojecting at least portions of the combined images of the subset of the vantages to the virtual viewpoint.

9. A non-transitory computer-readable medium for providing a virtual reality or augmented reality experience for a viewer, comprising instructions stored thereon, that when executed by a processor, perform the steps of:
causing a first input device to receive orientation data indicative of a viewer orientation at which a head of a viewer is oriented;
mapping the viewer orientation to an estimated viewer location by:
defining a ray at the viewer orientation;
locating an intersection of the ray with a three-dimensional shape; and
based on a three-dimensional location of the intersection, generating the estimated viewer location;
generating viewpoint video of a scene as viewed from a virtual viewpoint with a virtual location corresponding to the estimated viewer location, from along the viewer orientation; and
causing a display device to display the viewpoint video for the viewer.

10. The non-transitory computer-readable medium of claim 9, wherein:
the first input device is incorporated into a head-mounted display, and is incapable of providing an actual viewer location of the head; and
receiving the orientation data comprises receiving a three-dimensional measurement of the viewer orientation.

11. The non-transitory computer-readable medium of claim 9, wherein the three-dimensional shape is generally spherical.

12. The non-transitory computer-readable medium of claim 9, further comprising instructions stored thereon, that when executed by a processor, perform the steps of, prior to receiving the orientation data:
causing a second input device, receiving calibration data for each of a plurality of calibration orientations of the head of the viewer, indicative of:
a calibration viewer orientation at which the head is oriented; and
a calibration viewer position at which the head is positioned;
for each of the calibration orientations, using the calibration viewer orientation and the calibration viewer position to project a point; and
defining the three-dimensional shape based on locations of the points.

13. The non-transitory computer-readable medium of claim 12, further comprising instructions stored thereon, that when executed by a processor, store the three-dimensional shape in connection with an identity of the viewer prior to receipt of the orientation data.

14. The non-transitory computer-readable medium of claim 9, wherein:
the non-transitory computer-readable medium further comprises instructions stored thereon, that when executed by a processor, cause a storage device to retrieve at least part of a video stream captured by an image capture device prior to generating the viewpoint video; and
generating the viewpoint video comprises using at least part of the video stream.

15. The non-transitory computer-readable medium of claim 14, wherein:
the non-transitory computer-readable medium further comprises instructions stored thereon, that when executed by a processor, perform the steps of, prior to generating the viewpoint video:
designating a plurality of locations, distributed throughout a viewing volume, at which a plurality of vantages are to be positioned to facilitate viewing of the scene from proximate the locations;
for each location of the plurality of the locations:
retrieving a plurality of images of the scene captured from viewpoints proximate the location; and
combining the images to generate a combined image to generate a vantage; and
causing a data store, storing each of the vantages;
retrieving at least part of the video stream comprises retrieving at least a sub-set of the vantages; and
generating the viewpoint video comprises using the subset to generate the viewpoint video.

16. The non-transitory computer-readable medium of claim 15, wherein:
the non-transitory computer-readable medium further comprises instructions stored thereon, that when executed by a processor, identifies the subset of the vantages based on proximity of the vantages of the subset to the virtual viewpoint prior to retrieval of the subset of the vantages; and using the vantages to generate the viewpoint video comprises reprojecting at least portions of the combined images of the subset of the vantages to the virtual viewpoint.

17. A system for providing a virtual reality or augmented reality experience for a viewer, the system comprising:
    a first input device configured to receive orientation data indicative of a viewer orientation at which a head of a viewer is oriented;
    a processor configured to:
        map the viewer orientation to an estimated viewer location by:
        defining a ray at the viewer orientation;
        locating an intersection of the ray with a three-dimensional shape; and
        based on a three-dimensional location of the intersection, generating the estimated viewer location; and
        generate viewpoint video of a scene as viewed from a virtual view-point with a virtual location corresponding to the estimated viewer location, from along the viewer orientation; and
    a display device configured to display the viewpoint video for the viewer.

18. The system of claim 17, wherein:
    the first input device is incorporated into a head-mounted display, and is incapable of providing an actual viewer location of the head; and
    the first input device is configured to receive the orientation data by receiving a three-dimensional measurement of the viewer orientation.

19. The system of claim 17, wherein the three-dimensional shape is generally spherical.

20. The system of claim 17, further comprising a second input device configured to receive calibration data for each of a plurality of calibration orientations of the head of the viewer, indicative of:
    a calibration viewer orientation at which the head is oriented; and
    a calibration viewer position at which the head is positioned;
    and wherein the processor is further configured to:
        for each of the calibration orientations, use the calibration viewer orientation and the calibration viewer position to project a point; and
        define the three-dimensional shape based on locations of the points.

21. The system of claim 20, wherein the processor is further configured to store the three-dimensional shape in connection with an identity of the viewer prior to receipt of the orientation data.

22. The system of claim 17, further comprising a storage device configured to retrieve, prior to generation of the viewpoint video, at least part of a video stream captured by an image capture device;
    and wherein generating the viewpoint video comprises using at least part of the video stream.

23. The system of claim 22, wherein the processor is further configured to, prior to generation of the viewpoint video:
    designate a plurality of locations, distributed throughout a viewing volume, at which a plurality of vantages are to be positioned to facilitate viewing of the scene from proximate the locations; and
    for each location of the plurality of the locations:
        retrieving a plurality of images of the scene captured from viewpoints proximate the location; and
        combining the images to generate a combined image to generate a vantage;
    and wherein:
    the system further comprises a data store configured to store each of the vantages;
    the processor is further configured to retrieve at least part of the video stream by retrieving at least a subset of the vantages; and
    the processor is further configured to generate the viewpoint video by using the subset to generate the viewpoint video.

24. The system of claim 23, wherein:
    the processor is further configured to, prior to retrieval of the subset of the vantages, identify the subset of the vantages based on proximity of the vantages of the subset to a virtual viewpoint; and
    the processor is further configured to use the vantages to generate the viewpoint video by reprojecting at least portions of the combined images of the subset of the vantages to the virtual viewpoint.

* * * * *